US011790893B2

(12) United States Patent
Lee et al.

(10) Patent No.: US 11,790,893 B2
(45) Date of Patent: Oct. 17, 2023

(54) VOICE PROCESSING METHOD BASED ON ARTIFICIAL INTELLIGENCE

(71) Applicant: LG ELECTRONICS INC., Seoul (KR)

(72) Inventors: Kwangyong Lee, Seoul (KR); Hyun Yu, Seoul (KR); Byeongha Kim, Seoul (KR); Yejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 17/039,169

(22) Filed: Sep. 30, 2020

(65) Prior Publication Data

US 2021/0158802 A1 May 27, 2021

(30) Foreign Application Priority Data

Nov. 22, 2019 (KR) .................. 10-2019-0150984

(51) Int. Cl.
*G10L 15/16* (2006.01)
*H04W 72/1268* (2023.01)
*H04W 72/23* (2023.01)

(52) U.S. Cl.
CPC ......... *G10L 15/16* (2013.01); *H04W 72/1268* (2013.01); *H04W 72/23* (2023.01)

(58) Field of Classification Search
CPC ......... G10L 15/16; G10L 25/48; G10L 15/22; G10L 15/04; G10L 15/063; G10L 25/18; H04W 72/1268; H04W 72/1289; H04W 72/0413; H04W 72/23; H04W 72/21; G06N 3/02; H04L 5/0044; H04L 5/0051
See application file for complete search history.

(56) References Cited

U.S. PATENT DOCUMENTS

| 7,203,643 | B2 * | 4/2007 | Garudadri | ............... G10L 15/30 |
| | | | | 704/E15.047 |
| 10,339,918 | B2 * | 7/2019 | Hofer | ...................... G10L 15/22 |
| 10,923,122 | B1 * | 2/2021 | Rozycki | ............... G10L 15/285 |
| 11,062,700 | B1 * | 7/2021 | Azi | ......................... G10L 25/54 |

(Continued)

OTHER PUBLICATIONS

Basu, Saikat, et al. "Emotion recognition from speech using convolutional neural network with recurrent neural network architecture." 2017 2nd International Conference on Communication and Electronics Systems (ICCES). IEEE, 2017, pp. 333-336 (Year: 2017).*

(Continued)

*Primary Examiner* — Andrew C Flanders
*Assistant Examiner* — Michael C. Lee
(74) *Attorney, Agent, or Firm* — Birch, Stewart, Kolasch & Birch, LLP

(57) ABSTRACT

A voice processing method is disclosed. The voice processing method applies first and second sentence vectors extracted from first and second utterances, that are included in one dialog group and are separated from each other, to a learning model and generates an output from which at least one word having an overlapping meaning is removed. The voice processing method can be associated with an artificial intelligence module, an unmanned aerial vehicle (UAV), a robot, an augmented reality (AR) device, a virtual reality (VR) device, devices related to 5G services, and the like.

14 Claims, 14 Drawing Sheets

(56) References Cited

U.S. PATENT DOCUMENTS

| | | | | |
|---|---|---|---|---|
| 2009/0222265 | A1* | 9/2009 | Iwamiya | G10L 15/22 704/E15.046 |
| 2013/0013543 | A1* | 1/2013 | Dull | G05B 13/027 706/25 |
| 2014/0222430 | A1* | 8/2014 | Rao | G10L 15/04 704/254 |
| 2017/0046616 | A1* | 2/2017 | Socher | G06F 30/00 |
| 2017/0053646 | A1* | 2/2017 | Watanabe | G06N 3/0445 |
| 2017/0140753 | A1* | 5/2017 | Jaitly | G06F 40/55 |
| 2018/0181574 | A1* | 6/2018 | Chen | G06F 16/9535 |
| 2018/0190264 | A1* | 7/2018 | Mixter | H04L 51/224 |
| 2018/0190280 | A1* | 7/2018 | Cui | G10L 15/16 |
| 2018/0242219 | A1* | 8/2018 | Deluca | H04W 24/08 |
| 2018/0253648 | A1* | 9/2018 | Kaskari | G06K 9/627 |
| 2018/0276532 | A1* | 9/2018 | Kim | G06N 3/0445 |
| 2019/0139540 | A1* | 5/2019 | Kanda | G10L 15/197 |
| 2019/0155913 | A1* | 5/2019 | Singal | G06F 16/3344 |
| 2019/0235916 | A1* | 8/2019 | Min | G06F 3/048 |
| 2019/0333501 | A1* | 10/2019 | Kurtz | G10L 15/285 |
| 2019/0362712 | A1* | 11/2019 | Karpukhin | G06F 16/9535 |
| 2020/0034551 | A1* | 1/2020 | Cantrell | H04L 9/0866 |
| 2020/0380030 | A1* | 12/2020 | Colas | G10L 25/54 |
| 2021/0103606 | A1* | 4/2021 | Malhotra | G06F 16/9535 |
| 2022/0116247 | A1* | 4/2022 | Sengupta | H04L 5/0094 |

OTHER PUBLICATIONS

Definition of "Concatenate", Free On-Line Dictionary of Computing, available at https://web.archive.org/web/20170811040255/http://foldoc.org/concatenate (archived as of Aug. 11, 2017) (Year: 2017).*

Definition of "Vector", Free On-Line Dictionary of Computing, available at https://web.archive.org/web/20181109161459/http://foldoc.org/vector (archived as of Nov. 19, 2018) (Year: 2018).*

Filippova, Katja. "Multi-sentence compression: Finding shortest paths in word graphs." Proceedings of the 23rd international conference on computational linguistics. 2010. pp. 322-330 (Year: 2010).*

Wang, Yixiu, et al. "Multi-sentence Question Segmentation and Compression for Question Answering." Natural Language Processing and Chinese Computing: 4th CCF Conference, NLPCC 2015, Nanchang, China, Oct. 9-13, 2015, pp. 475-483 (Year: 2015).*

* cited by examiner

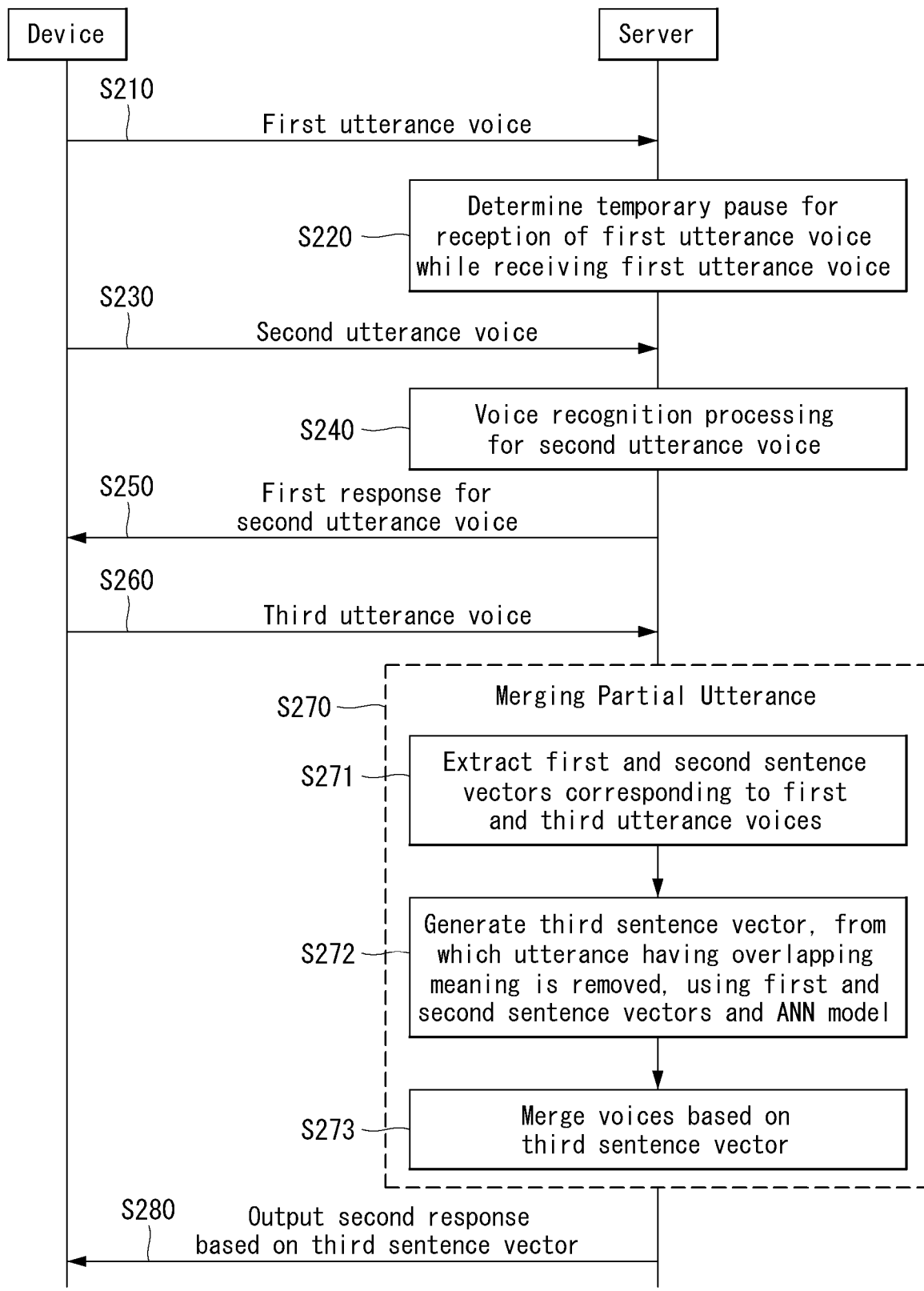

VOICE PROCESSING METHOD BASED ON ARTIFICIAL INTELLIGENCE

This application claims the priority benefit of Korean Patent Application No. 10-2019-0150984 filed on Nov. 22, 2019, which is incorporated herein by reference for all purposes as if fully set forth herein.

TECHNICAL FIELD

The present disclosure relates to a voice processing method based on artificial intelligence.

BACKGROUND

Machine learning (e.g., deep learning) is an algorithm technique that it itself may classify and learn the features of input data. The component technology is a technique for mimicking the human brain's perception and decision capabilities using a machine learning algorithm, and this may be divided into several technical fields, such as linguistic understanding, visual understanding, inference/prediction, knowledge expression, and operation control.

In language processing, it is necessary to derive an intention of one utterance by merging two or more utterances with respect to an incomplete utterance that is cut off during an utterance.

SUMMARY

An object of the present disclosure is to address the above-described and other needs and/or problems.

Another object of the present disclosure is to implement a voice processing method based on artificial intelligence capable of determining an utterance intention with respect to an incomplete utterance.

Another object of the present disclosure is to implement a voice processing method based on artificial intelligence capable of determining an utterance intention by merging two or more utterances with different pronunciation sequences.

Another object of the present disclosure is to implement a voice processing method based on artificial intelligence capable of performing voice processing in a natural sentence by merging two or more different utterances of various patterns to determine an utterance intention.

In one aspect of the present disclosure, there is provided a voice processing method comprising if a stop signal is detected during a reception of a first utterance, temporarily pausing the reception of the first utterance; receiving a second utterance after a termination of a temporary pause state based on the stop signal; and applying a concatenated vector concatenating first and second sentence vectors extracted from the first and second utterances to a pre-trained learning model to generate an output from which at least one word having an overlapping meaning is removed.

The stop signal may be a voice signal corresponding to one of a hesitation word, a silent delay, or a preset temporary pause keyword as a nonverbal element.

The voice processing method may further comprise, if the reception of the first utterance is temporarily paused, waiting for an additional voice input for the first utterance that is input before the temporary pause state.

The first sentence vector may be a vector representing an overall content of the first utterance.

The second sentence vector may be a vector concatenating a plurality of sub-vectors extracted from at least one word included in the second utterance.

Generating the output may comprise calculating a similarity between the first sentence vector and at least one of the plurality of sub-vectors constituting the second sentence vector; and if it is determined that the first sentence vector and the at least one of the plurality of sub-vectors have an overlapping meaning based on the similarity, generating an output from which at least one word having the overlapping meaning is removed.

The at least one word having the overlapping meaning may be a word corresponding to at least one of the plurality of sub-vectors that is calculated that the similarity is equal to or greater than a threshold.

The first and second sentence vectors may be extracted by a convolutional neural network (CNN).

The learning model may be a learning model based on an artificial neural network, and the artificial neural network may include an input layer, a hidden layer, and an output layer each having at least one node.

The learning model may be a learning model based on a recurrent neural network (RNN).

Some of the at least one node may have different weights in order to generate the output.

The second utterance may be an utterance belonging to the same dialog group as the first utterance.

In another aspect, there is provided a voice processing method comprising if a stop signal is detected while a first utterance is transmitted to a server, temporarily pausing the transmission of the first utterance; transmitting a second utterance to the server after a termination of a temporary pause state based on the stop signal; and applying a concatenated vector concatenating first and second sentence vectors extracted from the first and second utterances to a pre-trained learning model and receiving, from the server, an output from which at least one word having an overlapping meaning is removed.

Effects of a voice processing method based on artificial intelligence according to an embodiment of the present disclosure are described as follows.

The present disclosure can determine an utterance intention with respect to an incomplete utterance.

The present disclosure can determine an utterance intention by merging two or more utterances with different pronunciation sequences.

The present disclosure can perform voice processing in a natural sentence by merging two or more different utterances of various patterns to determine an utterance intention.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 14 is a sequence diagram illustrating a method of analyzing an intention of a separated utterance according to an embodiment of the present disclosure.

DETAILED DESCRIPTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
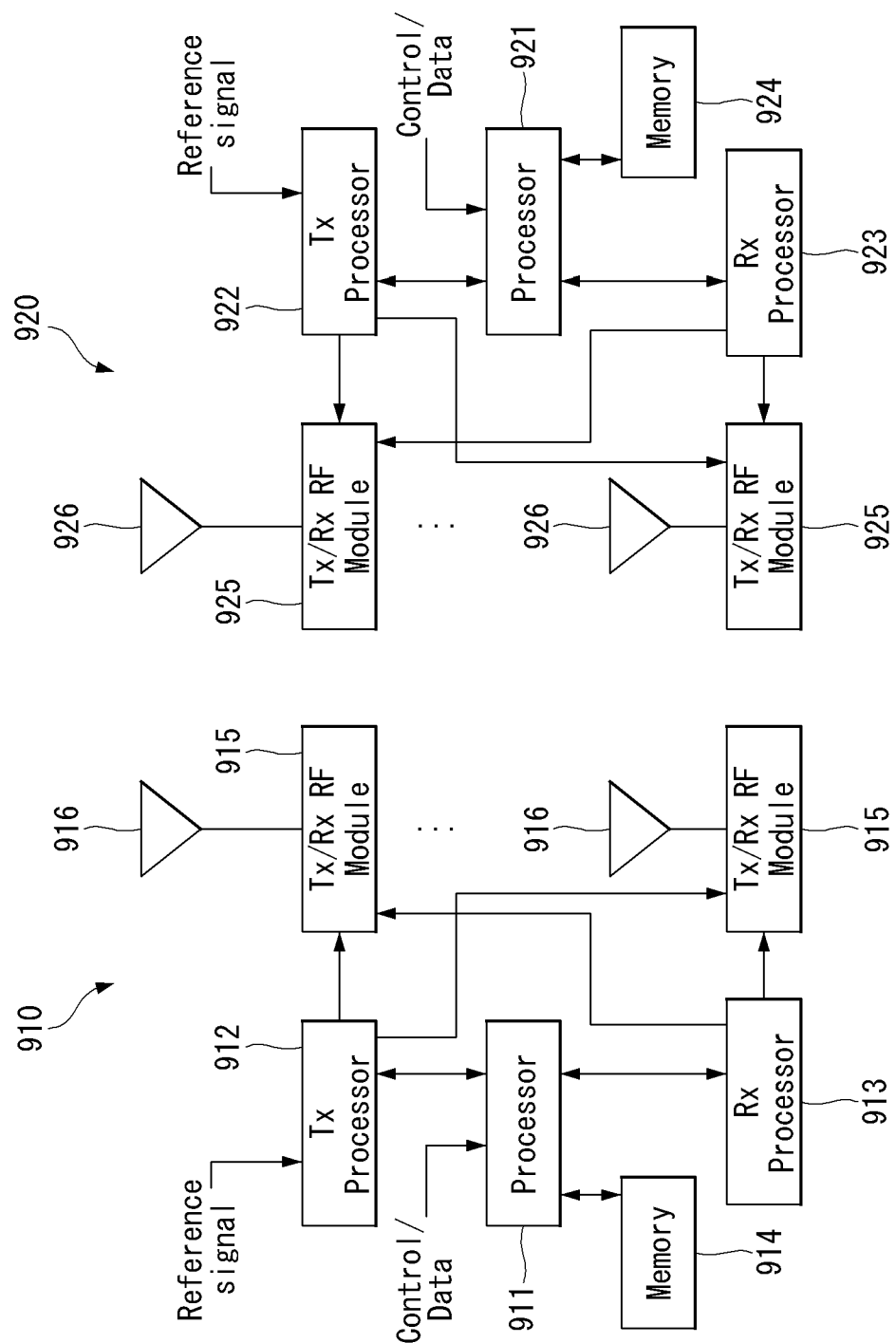
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
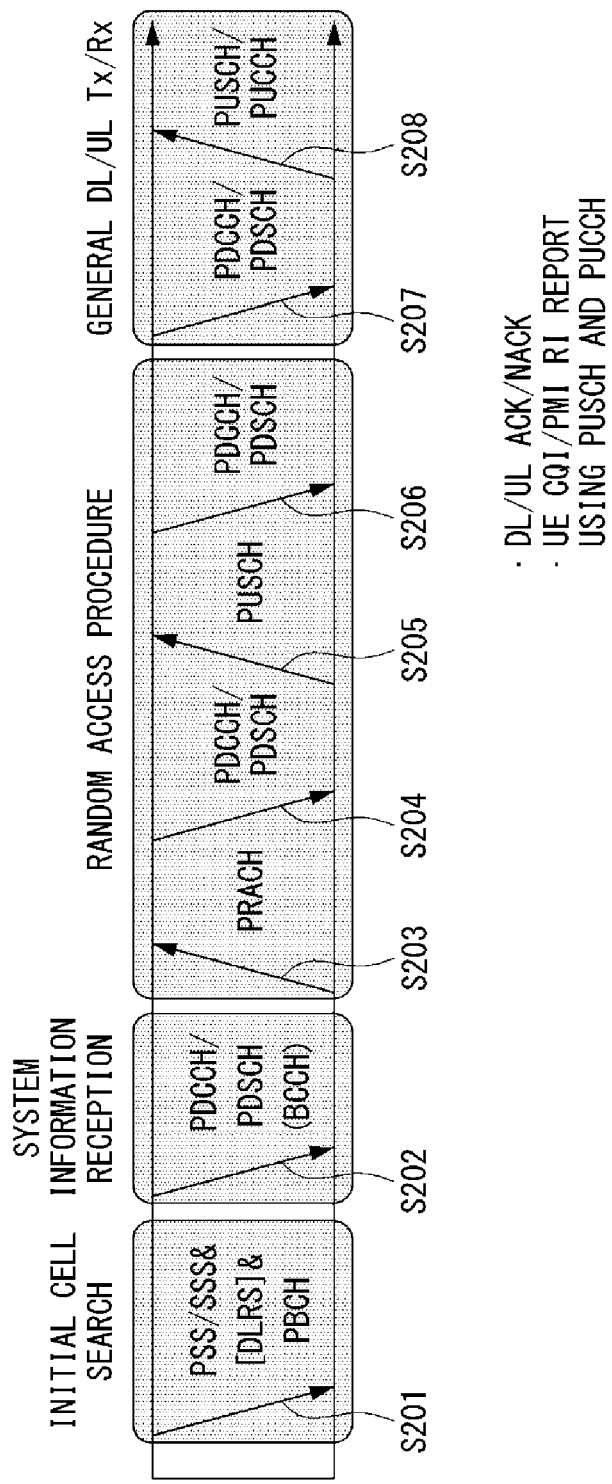
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a base station (BS) (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping.

The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. MMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation between User Equipments Using 5G Communication

Figure 3:
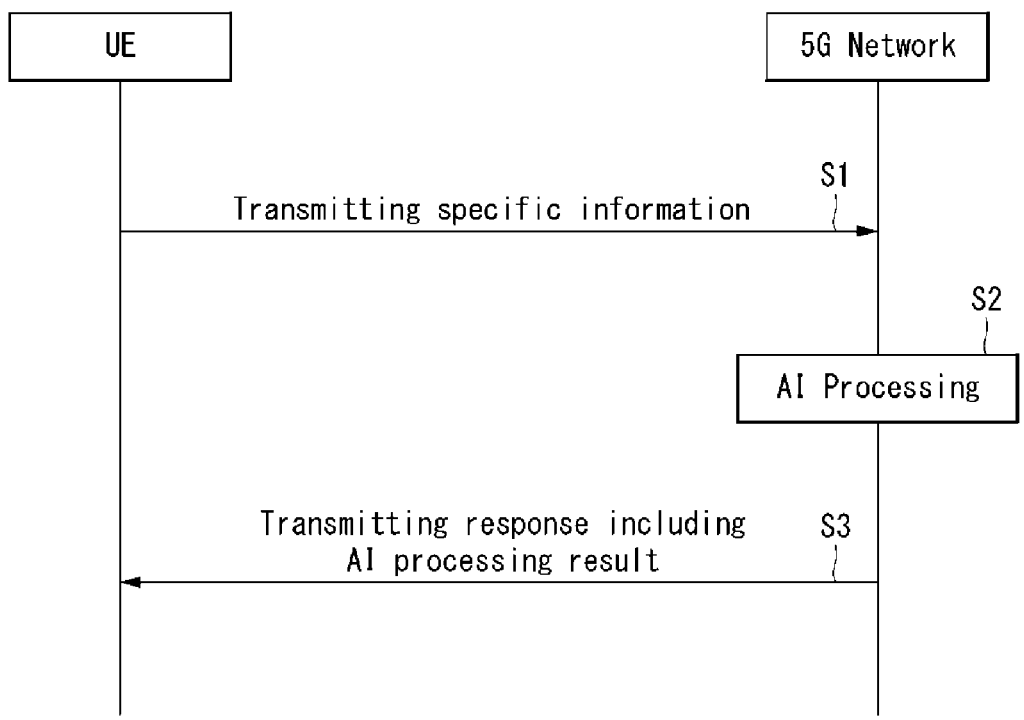
FIG. 3 shows an example of basic operations of an autonomous vehicle and a 5G network in a 5G communication system.

FIG. 3 shows an example of basic operations of a user equipment and a 5G network in a 5G communication system.

The user equipment transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the user equipment (S3).

G. Applied Operations Between User Equipment and 5G Network in 5G Communication System Hereinafter, the operation of a user equipment using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the user equipment performs an initial access procedure and a random access procedure with the 5G network prior to step S1 of FIG. 3 in order to transmit/receive signals, information and the like to/from the 5G network.

More specifically, the user equipment performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the user equipment receives a signal from the 5G network.

In addition, the user equipment performs a random access procedure with the 5G network for UL synchronization acquisition and/or UL transmission. The 5G network can transmit, to the user equipment, a UL grant for scheduling transmission of specific information. Accordingly, the user equipment transmits the specific information to the 5G network on the basis of the UL grant. In addition, the 5G network transmits, to the user equipment, a DL grant for scheduling transmission of 5G processing results with respect to the specific information. Accordingly, the 5G network can transmit, to the user equipment, information (or a signal) related to remote control on the basis of the DL grant.

Next, a basic procedure of an applied operation to which a method proposed by the present invention which will be described later and URLLC of 5G communication are applied will be described.

As described above, a user equipment can receive DownlinkPreemption IE from the 5G network after the user equipment performs an initial access procedure and/or a random access procedure with the 5G network. Then, the user equipment receives DCI format 2_1 including a preemption indication from the 5G network on the basis of DownlinkPreemption IE. The user equipment does not perform (or expect or assume) reception of eMBB data in resources (PRBs and/or OFDM symbols) indicated by the preemption indication. Thereafter, when the user equipment needs to transmit specific information, the user equipment can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the user equipment receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the user equipment transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
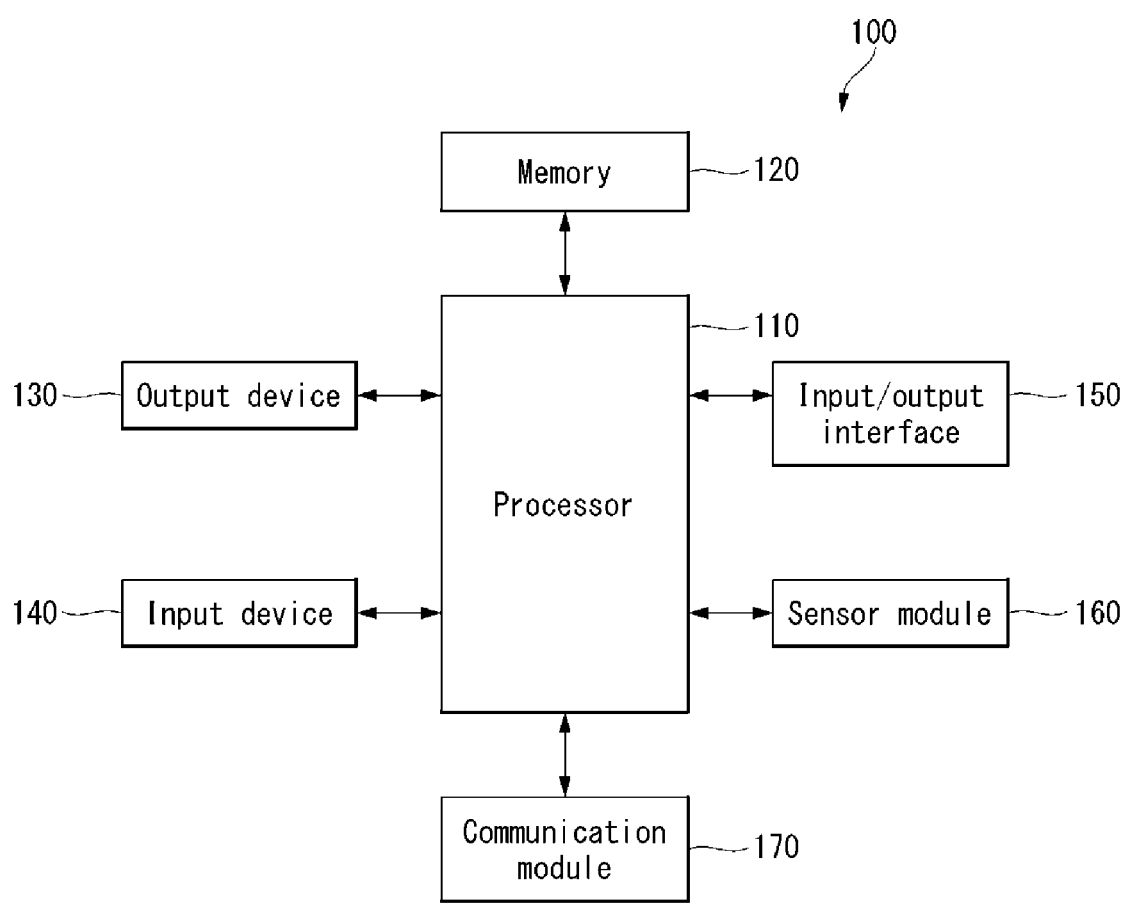
FIG. 4 illustrates a block diagram of an electronic device.

FIG. 4 illustrates a block diagram of an electronic device.

Referring to FIG. 4, an electronic device 100 may include at least one processor 110, a memory 120, an output device 130, an input device 140, an input/output interface 150, a sensor module 160, and a communication module 170.

The processor 110 may include at least one application processor (AP), at least one communication processor (CP), or at least one artificial intelligence (AI) processor. The application processor, the communication processor, or the AI processor may be respectively included in different integrated circuit (IC) packages, or may be included in one IC package.

The application processor may control a plurality of hardware or software components connected to the application processor by running an operating system or an application program, and perform various data processing/operation including multimedia data. For example, the application processor may be implemented as a system on chip (SoC). The processor 110 may further include a graphic processing unit (GPU) (not shown).

The communication processor may perform functions of managing a data link and converting a communication protocol in communication between the electronic device 100 and other electronic devices connected via a network. For example, the communication processor may be implemented as the SoC. The communication processor may perform at least a portion of a multimedia control function.

In addition, the communication processor may control data transmission and reception of the communication module 170. The communication processor may be implemented to be included as at least a part of the application processor.

The application processor or the communication processor may load, on a volatile memory, and process a command or data that is received from at least one of a non-volatile memory or other components connected to each of the application processor and the communication processor. Further, the application processor or the communication processor may store data, that is received from at least one of other components or generated by at least one of the other components, in the non-volatile memory.

The memory 120 may include an internal memory or an external memory. The internal memory may include at least one of a volatile memory (e.g., dynamic RAM (DRAM), static RAM (SRAM), synchronous dynamic RAM (SDRAM), etc.) or a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). According to an embodiment, the internal memory may take the form of a solid state drive (SSD). The external memory may include flash drive, for example, compact flash (CF), secure digital (SD), micro secure digital (Micro-SD), mini secure digital (Mini-SD), extreme digital (xD) or a memory stick, etc.

The output device 130 may include at least one of a display module or a speaker. The output device 130 may display various types of data including multimedia data, text data, voice data, etc. to a user or output the data as sound.

The input device 140 may include a touch panel, a digital pen sensor, a key, or an ultrasonic input device, etc. For example, the input device 140 may be the input/output interface 150. The touch panel may recognize a touch input in at least one of capacitive, pressure-sensitive, infrared, or ultrasonic types. In addition, the touch panel may further include a controller (not shown). In case of a capacitive touch panel, not only direct touch but also proximity recognition is possible. The touch panel may further include a tactile layer. In this case, the touch panel may provide a tactile reaction to the user.

The digital pen sensor may be implemented using the same or similar method to receiving a user's touch input or a separate recognition layer. The key may use a keypad or a touch key. The ultrasonic input device is a device that can confirm data by detecting a micro-sonic wave at a user equipment (UE) through a pen generating an ultrasonic signal, and is capable of wireless recognition. The electronic device 100 may also receive a user input from an external device (e.g., network, computer, or server) connected to the communication module 170 using the communication module 170.

The input device 140 may further include a camera module and a microphone. The camera module is a device capable of taking images and videos, and may include one or more image sensors, an image signal processor (ISP), or a flash LED. The microphone may receive a voice signal and convert it into an electrical signal.

The input/output interface 150 may transmit a command or data, that is input from the user through the input device or the output device, to the processor 110, the memory 120, the communication module 170, etc. through a bus (not shown). For example, the input/output interface 150 may provide the processor 110 with data for a user's touch input that is input through the touch panel. For example, the input/output interface 150 may output a command or data, that is received from the processor 110, the memory 120, the communication module 170, etc. through the bus, through the output device 130. For example, the input/output interface 150 may output voice data processed by the processor 110 to the user through the speaker.

The sensor module 160 may include at least one of a gesture sensor, a gyro sensor, an atmospheric pressure sensor, a magnetic sensor, an acceleration sensor, a grip sensor, a proximity sensor, an RGB (red, green, blue) sensor, a biometric sensor, a temperature/humidity sensor, an illuminance sensor, or an ultraviolet (UV) sensor. The sensor module 160 may measure physical quantity or sense an operating state of the electronic device 100 to convert measured or sensed information into electrical signals. Additionally or alternatively, the sensor module 160 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, a fingerprint sensor, or the like. The sensor module 160 may further include a control circuit for controlling at least one sensor included therein.

The communication module 170 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface or a modem, etc. for connecting the electronic device 100 to a network (e.g., Internet, LAN, WAN, telecommunication network, cellular network, satellite network, POTS or 5G network, etc.).

The RF module may be responsible for transmitting and receiving data, for example, transmitting and receiving an RF signal or a called electronic signal. For example, the RF module may include a transceiver, a power amp module (PAM), a frequency filter, or a low noise amplifier (LNA), etc. Further, the RF module may further include components, for example, conductors or lead wires, etc. for transmitting and receiving electromagnetic waves in a free space in wireless communication.

The electronic device 100 according to various embodiments of the present disclosure may include at least one of a server, a TV, a refrigerator, an oven, a clothing styler, a robot cleaner, a drone, an air conditioner, an air cleaner, a PC, a speaker, a home CCTV, an electric light, a washing machine, and a smart plug. Since the components of the electronic device 100 illustrated in FIG. 4 are exemplified as components generally provided in an electronic device, the electronic device 100 according to the embodiment of the present disclosure is not limited to the above-described components, and the components may be omitted and/or added, if necessary or desired.

Figure 5:
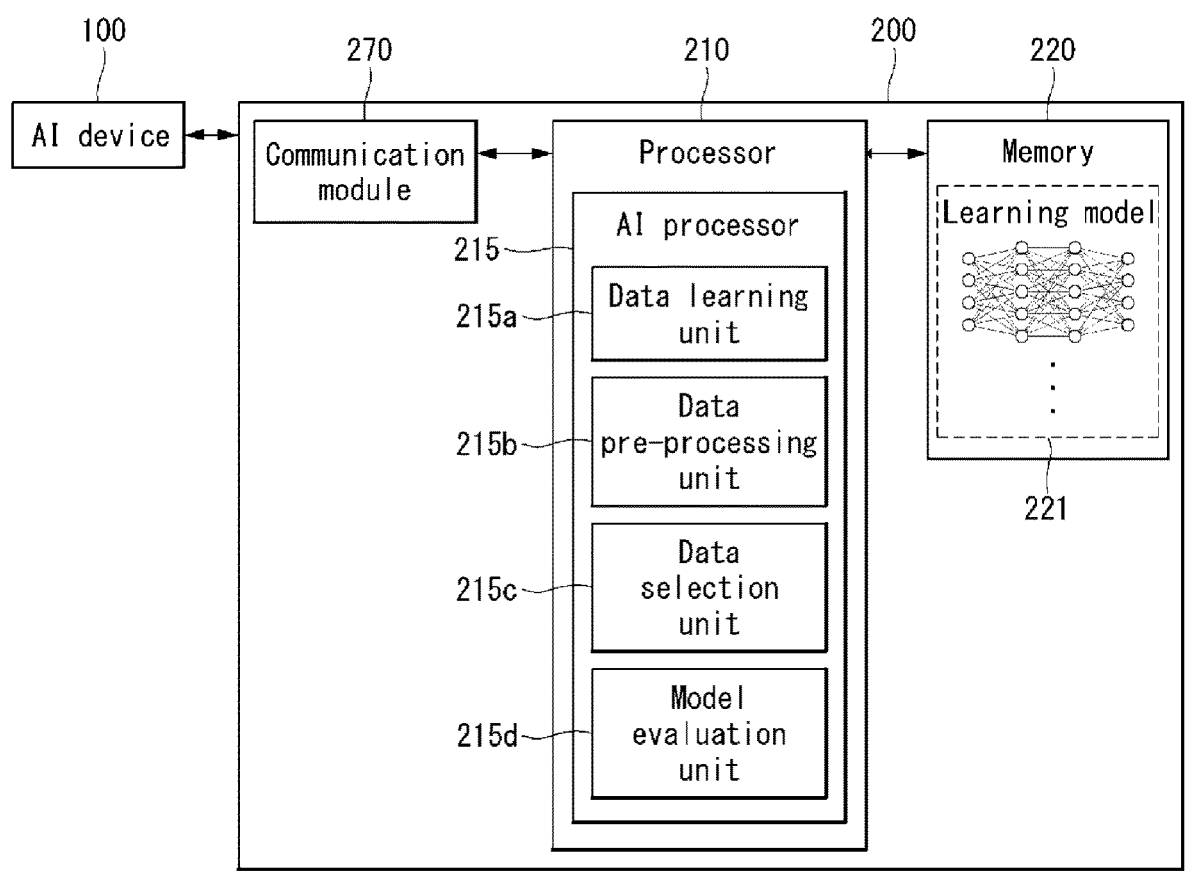
FIG. 5 illustrates a schematic block diagram of an AI server according to an embodiment of the present disclosure.

The electronic device 100 may perform an artificial intelligence-based control operation by receiving a result of AI processing from a cloud environment illustrated in FIG. 5, or may perform AI processing in an on-device manner by including an AI module in which components related to an AI process are integrated into one module.

An AI process performed in a device environment and/or a cloud environment or a server environment is described below with reference to FIGS. 5 and 6. FIG. 5 illustrates an example in which receiving data or signals may be performed in the electronic device 100, but AI processing for processing the input data or signals is performed in the cloud environment. In contrast, FIG. 6 illustrates an example of on-device processing in which the overall operation of AI processing for input data or signals is performed in the electronic device 100.

Figure 6:
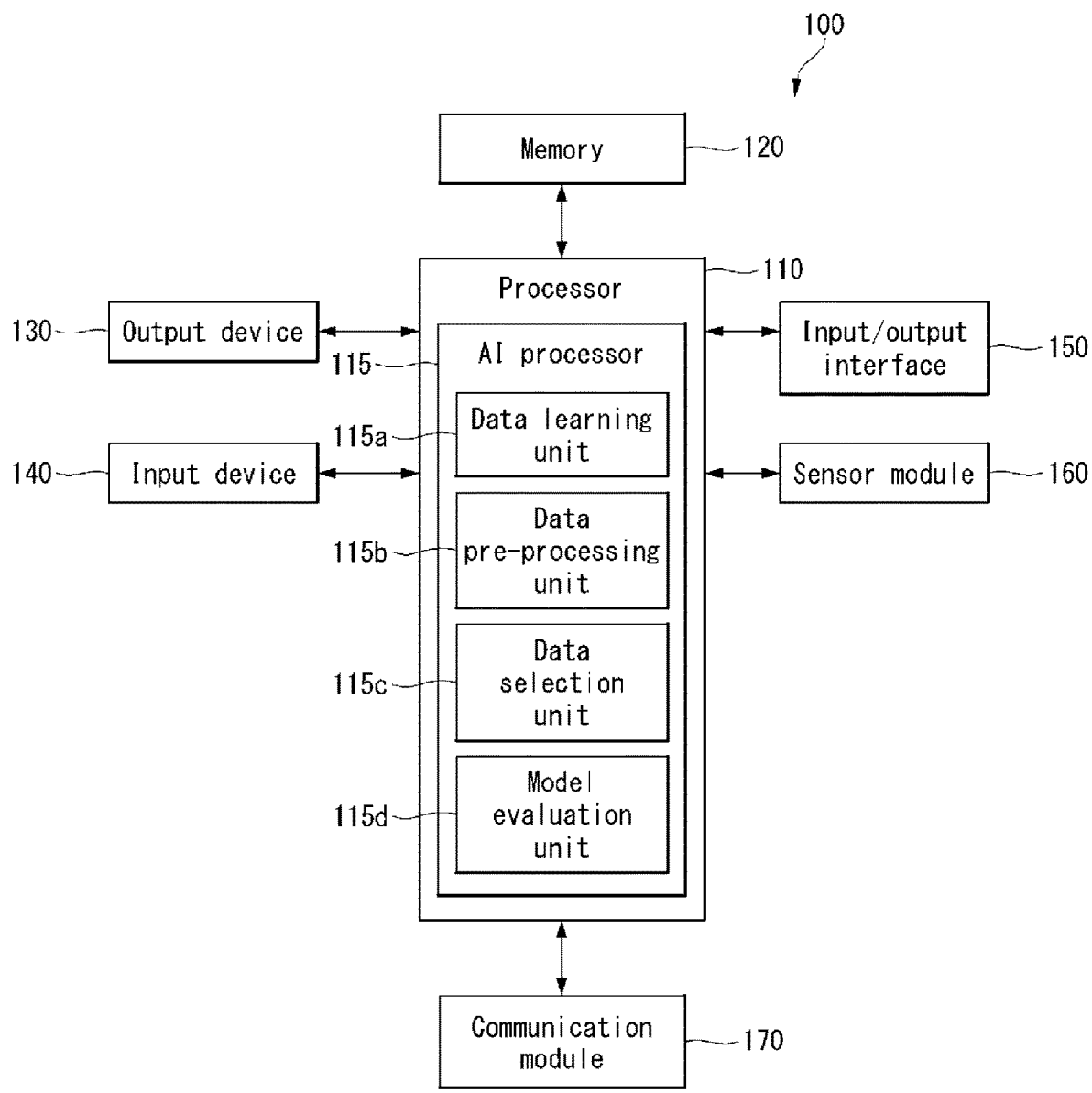
FIG. 6 illustrates a schematic block diagram of an AI device according to another embodiment of the present disclosure.

In FIGS. 5 and 6, the device environment may be referred to as a 'client device' or an 'AI device', and the cloud environment may be referred to as a 'server'.

FIG. 5 illustrates a schematic block diagram of an AI server according to an embodiment of the present disclosure.

A server 200 may include a processor 210, a memory 220, and a communication module 270.

An AI processor 215 may learn a neural network using a program stored in the memory 220. In particular, the AI processor 215 may learn the neural network for recognizing data related to an operation of an AI device 100. Here, the neural network may be designed to simulate the human brain structure (e.g., the neuronal structure of the human neural network) on a computer. The neural network may include an input layer, an output layer, and at least one hidden layer. Each layer may include at least one neuron with a weight, and the neural network may include a synapse connecting neurons and neurons. In the neural network, each neuron may output an input signal input through the synapse as a function value of an activation function for weight and/or bias.

A plurality of network modes may exchange data according to each connection relationship so that neurons simulate synaptic activity of neurons that exchange signals through the synapses. Here, the neural network may include a deep learning model developed from a neural network model. In the deep learning model, a plurality of network nodes is located on different layers and may exchange data according to a convolution connection relationship. Examples of the neural network model may include various deep learning techniques such as a deep neural network (DNN), a convolutional neural network (CNN), a recurrent neural network, a restricted Boltzmann machine, a deep belief network, and a deep Q-Network, and may be applied in fields such as vision recognition, voice recognition, natural language processing, and voice/signal processing.

The processor 210 performing the functions described above may be a general-purpose processor (e.g., a CPU), but may be a dedicated AI processor (e.g., a GPU) for AI learning.

The memory 220 may store various programs and data necessary for the operation of the AI device 100 and/or the server 200. The memory 220 may be accessed by the AI processor 215, and may read/write/modify/delete/update data by the AI processor 215. In addition, the memory 220 may store a neural network model (e.g., the deep learning model) generated through a learning algorithm for data classification/recognition according to an embodiment of the present disclosure. Furthermore, the memory 220 may store not only a learning model 221 but also input data, training data, and learning history, etc.

The AI processor 215 may include a data learning unit 215a for learning a neural network for data classification/recognition. The data learning unit 215a may learn criteria regarding what training data to use to determine data classification/recognition, and how to classify and recognize the data using the training data. The data learning unit 215a may learn the deep learning model by acquiring training data to be used for learning and applying the acquired training data to the deep learning model.

The data learning unit 215a may be manufactured in a form of at least one hardware chip and may be mounted on the server 200. For example, the data learning unit 215a may be manufactured in a form of a dedicated hardware chip for artificial intelligence, or may be manufactured as part of a general-purpose processor (CPU) or a dedicated graphics processor (GPU) and mounted on the server 200. In addition, the data learning unit 215a may be implemented as a software module. When the data learning unit 215a is implemented as the software module (or a program module including instructions), the software module may be stored in a non-transitory computer readable media. In this case, at least one software module may be provided to an operating system (OS), or may be provided by an application.

The data learning unit 215a may learn the neural network model to have criteria for determining how to classify/recognize preset data using the acquired training data. In this instance, a learning method by a model learning unit may be classified into supervised learning, unsupervised learning, and reinforcement learning. Here, the supervised learning may refer to a method of learning an artificial neural network in a state where a label for training data is given, and the label may mean a correct answer (or a result value) that the artificial neural network has to infer when the training data is input to the artificial neural network. The unsupervised learning may mean a method of learning an artificial neural network in a state where the label for training data is not given. The reinforcement learning may mean a method in which an agent defined in a specific environment is learned to select an action or a sequence of actions that maximize cumulative rewards in each state. Further, the model learning unit may learn the neural network model using a learning algorithm including an error backpropagation method or a gradient decent method. When the neural network model is learned, the learned neural network model may be referred to as the learning model 221. The learning model 221 is stored in the memory 220 and may be used to infer a result for new input data rather than the training data.

The AI processor 215 may further include a data pre-processing unit 215b and/or a data selection unit 215c, in order to improve analysis results using the learning model 221 or to save resources or time required to generate the learning model 221.

The data pre-processing unit 215b may pre-process the acquired data so that the acquired data can be used for learning/inference for determining a situation. For example, the data pre-processing unit 215b may extract feature information as pre-processing for input data acquired through the input device, and the feature information may be extracted in a format such as a feature vector, a feature point, or a feature map.

The data selection unit 215c may select data necessary for learning among training data or training data pre-processed by the pre-processing unit. The selected training data may be provided to the model learn unit. For example, the data selection unit 215c may select only data for an object included in a specific region as training data by detecting the specific region among images acquired through a camera of the electronic device. Further, the selection unit 215c may select data necessary for inference among input data acquired through the input device or input data pre-processed by the pre-processing unit.

The AI processor 215 may further include a model evaluation unit 215d to improve the analysis results of the neural network model. The model evaluation unit 215d may input evaluation data into the neural network model and may allow the model learning unit to learn again when an analysis result output from the evaluation data does not satisfy a predetermined criterion. In this case, the evaluation data may be preset data for evaluating the learning model 221. For example, among the analysis results of the learned neural network model for the evaluation data, when the number or ratio of evaluation data whose analysis results are not accurate exceeds a preset threshold, the model evaluation unit 215d may evaluate that a predetermined criterion are not satisfied.

The communication module 270 may send a result of AI processing by the AI processor 215 to an external electronic device.

As described above, FIG. 5 illustrates that the AI process is implemented in the cloud environment due to computing operation, storage, and power constraints, by way of example, but the present disclosure is not limited thereto. For example, the AI processor 215 may be implemented by being included in a client device. FIG. 6 is an example in which AI processing is implemented in the client device, and is substantially the same as that illustrated in FIG. 5 except that the AI processor 215 is included in the client device. For example, similar to the server 500 in FIG. 5, the client device 100 can include an AI processor 115, a data learning unit 115a, a data pre-processing unit 115b, a data selection unit 115c, and a model evaluation unit 115d.

FIG. 6 illustrates a schematic block diagram of an AI device according to another embodiment of the present disclosure.

The function of each configuration illustrated in FIG. 6 may refer to FIG. 5. However, since the AI processor is included in a client device 100, it may not be necessary to communicate with the server 200 (see FIG. 5) in performing a process such as data classification/recognition, etc., and hence an immediate or real-time data classification/recognition operation is possible. Further, since it is not necessary to send personal information of the user to the server 200 (see FIG. 5), it is possible to classify/recognize data for the purpose without leaking the personal information.

The respective components illustrated in FIGS. 5 and 6 indicate functional elements that are divided functionally, and it is noted that at least one component can be implemented in a form (e.g., AI module) integrated with each other in a real physical environment. It goes without saying that components that are not disclosed may be included or omitted, in addition to the plurality of components illustrated in FIGS. 5 and 6.

Figure 7:
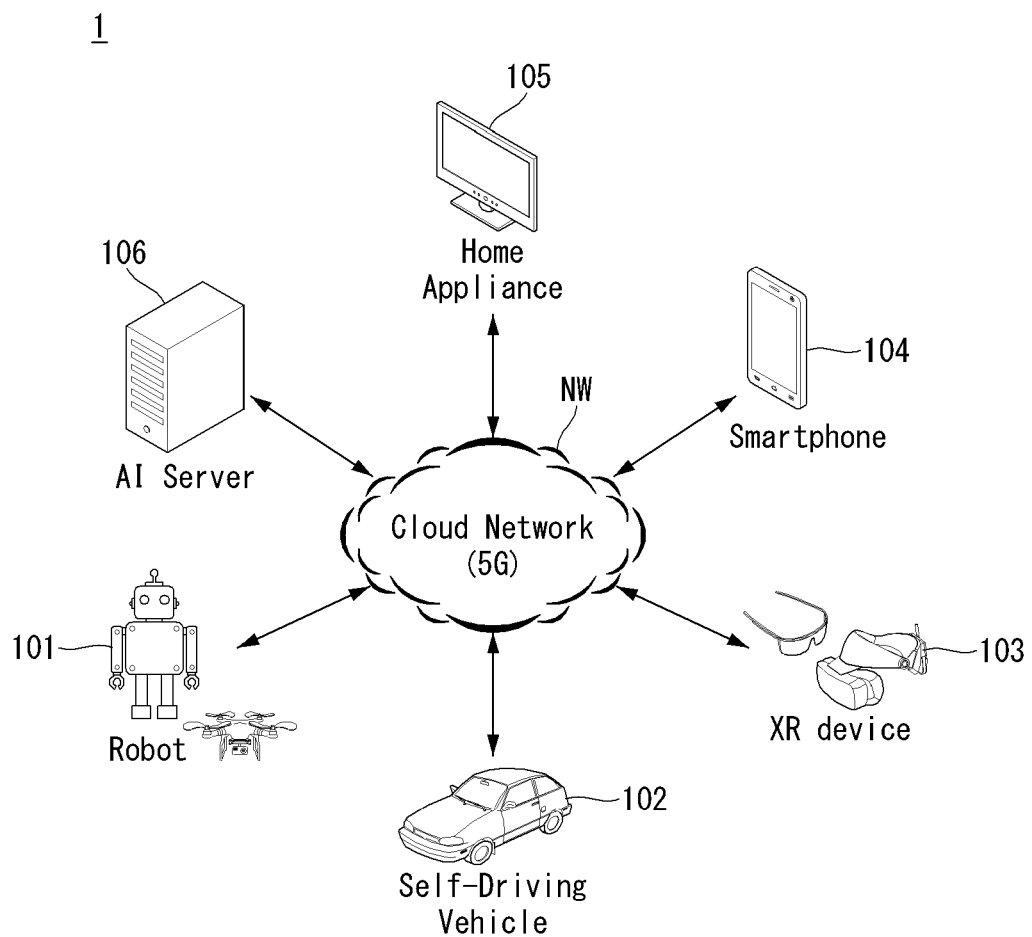
FIG. 7 is a conceptual diagram of an AI device according to an embodiment of the present disclosure.

FIG. 7 is a conceptual diagram of an AI device according to an embodiment of the present disclosure.

Referring to FIG. 7, in an AI system 1, at least one of an AI server 106, a robot 101, an autonomous vehicle 102, an XR device 103, a smartphone 104, or a home appliance 105 is connected to a cloud network NW. The robot 101, the autonomous vehicle 102, the XR device 103, the smartphone 104, or the home appliance 105 applied with the AI technology may be referred to as the AI devices 101 to 105.

The cloud network NW may mean a network that forms a part of a cloud computing infrastructure or exists in the cloud computing infrastructure. The cloud network NW may be configured using the 3G network, the 4G or Long Term Evolution (LTE) network, or the 5G network.

That is, the respective devices 101 to 106 constituting the AI system 1 may be connected to each other via the cloud network NW. In particular, the respective devices 101 to 106 may communicate with each other through a base station, but may directly communicate with each other without going through the base station.

The AI server 106 may include a server performing AI processing and a server performing operations on big data.

The AI server 106 may be connected to at least one of the robot 101, the autonomous vehicle 102, the XR device 103, the smartphone 104, or the home appliance 105, which are AI devices constituting the AI system, via the cloud network NW, and may assist at least a part of the AI processing of the connected AI devices 101 to 105.

In this instance, the AI server 106 may learn the artificial neural network according to a machine learning algorithm instead of the AI devices 101 to 105, and directly store the learning model or send it to the AI devices 101 to 105.

In this instance, the AI server 106 may receive input data from the AI devices 101 to 105, infer a result value for the received input data using the learning model, generate a response or a control command based on the inferred result value, and transmit it to the AI devices 101 to 105.

Alternatively, the AI devices 101 to 105 may infer the result value for the input data directly using the learning model and generate a response or a control command based on the inferred result value.

Figure 8:
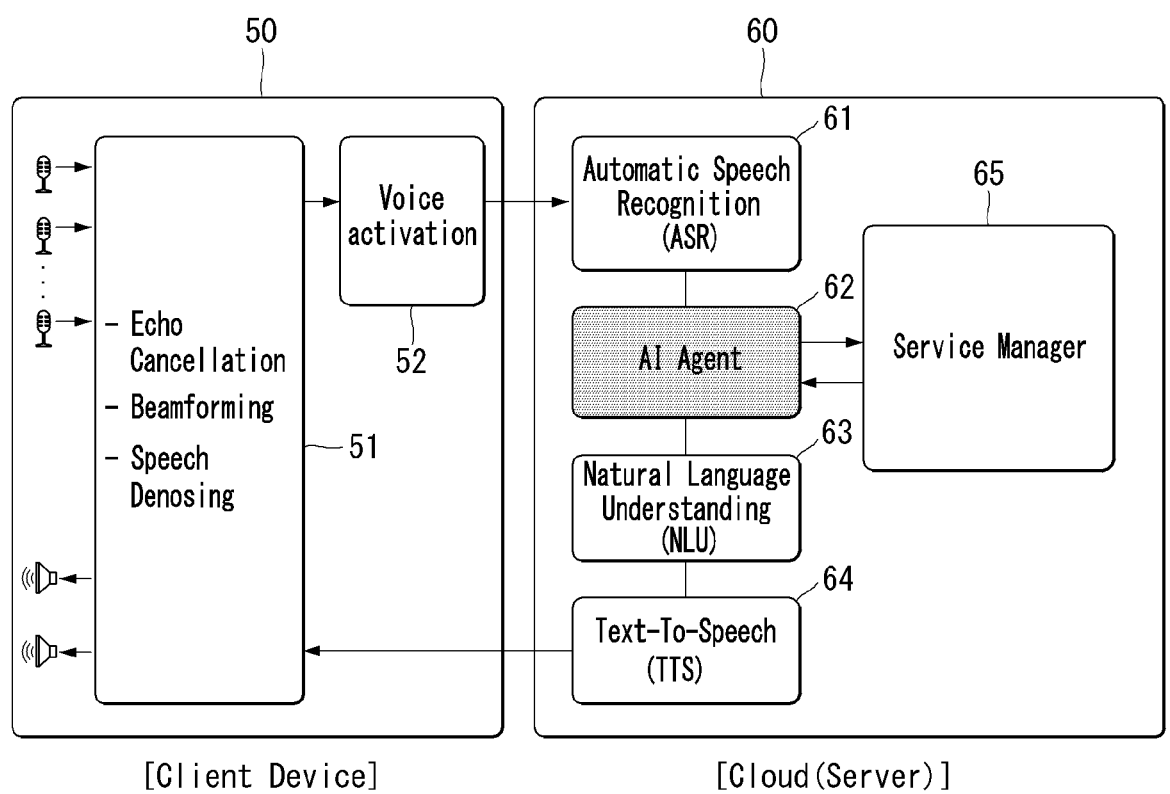
FIG. 8 is an example block diagram of a voice processing device according to an embodiment of the present disclosure.

A speech processing performed in the device environment and/or the cloud environment or the server environment is described below with reference to FIGS. 8 and 9. FIG. 8 illustrates an example in which the input of speech may be performed in the device 50, but the process of synthesizing the speech by processing the input speech, that is, the overall operation of the speech processing is performed in the cloud environment 60. On the other hand, FIG. 9 illustrates an example of on-device processing in which the overall operation of the speech processing to synthesize the speech by processing the input speech described above is performed in the device 70.

Figure 9:
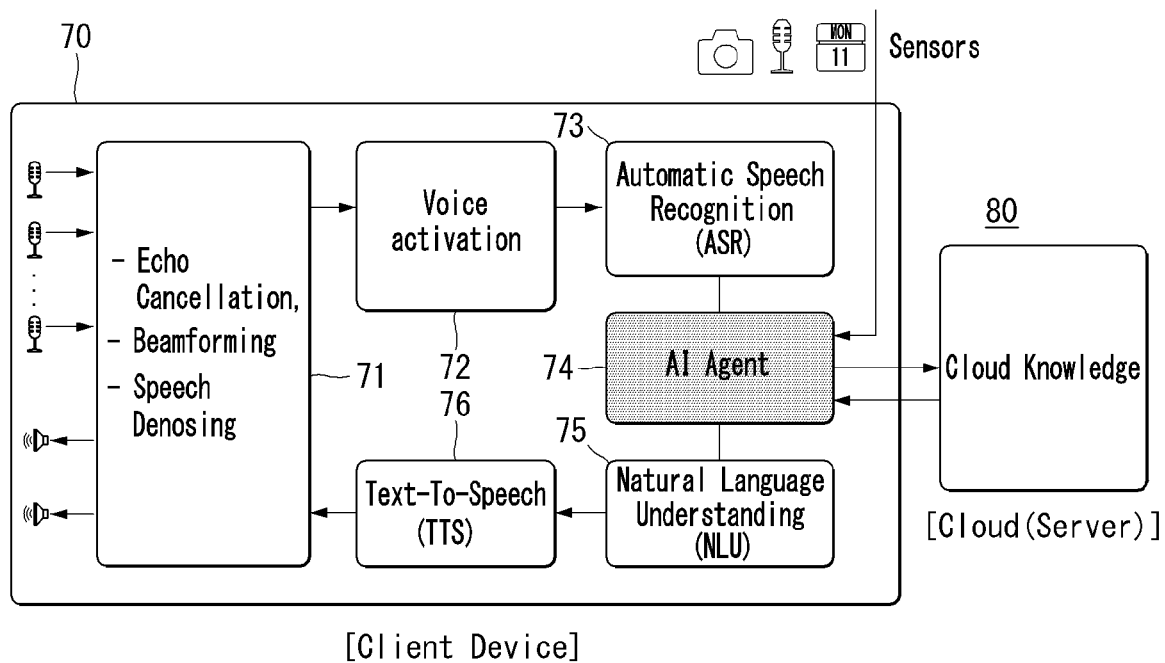
FIG. 9 is an example block diagram of a voice processing device according to another embodiment of the present disclosure.

In FIGS. 8 and 9, the device environments 50 and 70 may be referred to as a client device, and the cloud environments 60 and 80 may be referred to as a server.

FIG. 8 is an example block diagram of a voice processing device in a voice processing system according to an embodiment of the present disclosure.

In an end-to-end speech UI environment, various components are required to process speech events. The sequence for processing the speech event performs speech signal acquisition and playback, speech pre-processing, voice activation, speech recognition, natural language processing, and finally a speech synthesis process in which the device responds to the user.

A client device 50 may include an input module. The input module may receive a user input from a user. For example, the input module may receive the user input from a connected external device (e.g., keyboard, headset). For example, the input module may include a touch screen. For example, the input module may include a hardware key located on a user terminal.

According to an embodiment, the input module may include at least one microphone capable of receiving a user's speech as a voice signal. The input module may include a speech input system, and may receive a user's speech as a voice signal through the speech input system. The at least one microphone may generate an input signal for audio input, thereby determining a digital input signal for the user's speech. According to an embodiment, a plurality of microphones may be implemented as an array. The array may be arranged in a geometric pattern, for example, a linear geometric form, a circular geometric form, or other configurations. For example, for a predetermined position, the array of four sensors may be separated by 90° and arranged in a circular pattern, in order to receive sound from four directions. In some implementations, the microphone may include spatially different arrays of sensors in data communication, including a networked array of sensors. The microphone may include omnidirectional, directional (e.g., shotgun microphone), and the like.

The client device 50 may include a pre-processing module 51 capable of pre-processing the user input (voice signals) received through the input module (e.g., microphone).

The pre-processing module 51 may remove an echo included in a user voice signal input through the microphone by including an adaptive echo canceller (AEC) function. The pre-processing module 51 may remove a background noise included in the user input by including a noise suppression (NS) function. The pre-processing module 51 may detect an end point of a user's voice and find a part in which the user's voice is present, by including an end-point detect (EPD) function. In addition, the pre-processing module 51 may adjust a volume of the user input to be suitable for recognizing and processing the user input by including an automatic gain control (AGC) function.

The client device 50 may include a voice activation module 52. The voice activation module 52 may recognize a wake up command that recognizes a user's call. The voice activation module 52 may detect a predetermined keyword (e.g., Hi LG) from the user input that has undergone a pre-processing process. The voice activation module 52 may exist in a standby state to perform an always-on keyword detection function.

The client device 50 may transmit a user voice input to a cloud server. Automatic speech recognition (ASR) and natural language understanding (NLU) operations, which are core components for processing a user voice, are generally executed in the cloud due to computing, storage, and power constraints. The cloud may include a cloud device 60 that processes the user input transmitted from a client. The cloud device 60 may exist in the form of a server.

The cloud device 60 may include an automatic speech recognition (ASR) module 61, an artificial intelligence (AI) agent 62, a natural language understanding (NLU) module 63, a text-to-speech (TTS) module 64, and a service manager 65.

The ASR module 61 may convert the user voice input received from the client device 50 into text data.

The ASR module 61 includes a front-end speech pre-processor. The front-end speech pre-processor extracts representative features from a speech input. For example, the front-end speech pre-processor performs Fourier transformation on the speech input to extract spectral features that characterize the speech input as a sequence of representative multidimensional vectors. The ASR module 61 may include one or more speech recognition models (e.g., acoustic models and/or language models) and implement one or more speech recognition engines. Examples of the speech recognition models include hidden Markov models, Gaussian-Mixture Models, deep neural network models, n-gram language models, and other statistical models. Examples of the speech recognition engines include a dynamic time distortion-based engine and a weighted finite state transducer (WFST)-based engine. The one or more speech recognition models and the one or more speech recognition engines may be used to process the extracted representative features of the front-end speech pre-processor to generate intermediate recognition results (e.g., phonemes, phoneme strings, and sub-words) and ultimately text recognition results (e.g., words, word strings, or a sequence of tokens).

If the ASR module 61 generates a recognition result including text strings (e.g., words, or a sequence of words, or a sequence of tokens), the recognition result is sent to a natural language processing module for intention inference. In some examples, the ASR module 61 generates multiple candidate text representations of the speech input. Each candidate text representation is a sequence of words or tokens corresponding to the speech input.

The NLU module 63 may grasp a user intention by performing syntactic analysis or semantic analysis. The syntactic analysis may divide syntactic units (e.g., words, phrases, morphemes, etc.) and grasp what syntactic elements the divided units have. The semantic analysis may be performed using semantic matching, rule matching, or formula matching, etc. Hence, the NUL module 63 may acquire a domain, an intention, or a parameter necessary for expressing the intention by a user input.

The NLU module 63 may determine a user's intention and parameters using a mapping rule divided into the domain, the intention, and the parameter required to grasp the intention. For example, one domain (e.g., alarm) may include a plurality of intentions (e.g., alarm setting, alarm off), and one intention may include a plurality of parameters (e.g., time, number of repetitions, alarm sound, etc.). A plurality of rules may include, for example, one or more essential element parameters. The matching rule may be stored in a natural language understanding database.

The NLU module 63 grasps the meaning of words extracted from the user input by using linguistic features (e.g., syntactic elements) such as morphemes and phrases, and determines the user's intention by matching the meaning of the grasped word to a domain and an intention. For example, the NLU module 63 may determine the user intention by calculating how many words extracted from the user input are included in each domain and intention. According to an embodiment, the NLU module 63 may determine a parameter of the user input using words that are the basis for grasping the intention. According to an embodiment, the NLU module 63 may determine the user's intention using the natural language recognition database in which linguistic features for grasping the intention of the user input are stored. In addition, according to an embodiment, the NLU module 63 may determine the user's intention using a personal language model (PLM). For example, the NLU module 63 may determine the user's intention using personalized information (e.g., contact list, music list, schedule information, social network information, etc.). The personal language model may be stored, for example, in the natural language recognition database. According to an embodiment, the ASR module 61 as well as the NLU module 63 may recognize the user's voice by referring to the personal language model stored in the natural language recognition database.

The NLU module 63 may further include a natural language generation module (not shown). The natural language generation module may change designated information into the form of text. The information changed into the text form may be in the form of natural language speech. The designated information may include, for example, information about additional input, information guiding completion of an operation corresponding to the user input, or information guiding an additional input of the user, etc. The information changed into the text form may be transmitted to the client device and displayed on a display, or transmitted to a TTS module and changed to a voice form.

A speech synthesis module (TTS module) 64 may change text type information into voice type information. The TTS module 64 may receive the text type information from the natural language generation module of the NLU module 63 and change the text-type information into the voice type information to transmit it to the client device 50. The client device 50 may output the voice type information through the speaker.

The speech synthesis module 64 synthesizes a speech output based on a provided text. For example, the result generated by the automatic speech recognition (ASR) module 61 is in the form of a text string. The speech synthesis module 64 converts the text string into an audible speech output. The speech synthesis module 64 uses any suitable speech synthesis technique to generate speech output from texts, and this includes concatenative synthesis, unit selection synthesis, diphone synthesis, domain-specific synthesis, formant synthesis, articulatory synthesis, hidden Markov model (HMM)-based synthesis, and sinewave synthesis, but is not limited thereto.

In some embodiments, the speech synthesis module 64 is configured to synthesize individual words based on the phoneme string corresponding to the words. For example, the phoneme string is associated with a word in the generated text string. The phoneme string is stored in metadata associated with words. The speech synthesis module 64 is configured to directly process the phoneme string in the metadata to synthesize speech-type words.

Since the cloud environment generally has more processing power or resources than the client device, it is possible to acquire a speech output of higher quality than actual in client-side synthesis. However, the present disclosure is not limited to this, and it goes without saying that a speech synthesis process can be actually performed on the client side (see FIG. 9).

According to an embodiment of the present disclosure, the cloud environment may further include an AI agent 62. The AI agent 62 may be designed to perform at least some of the functions performed by the ASR module 61, the NLU module 63, and/or the TTS module 64 described above. In addition, the AI agent 62 may contribute to perform an independent function of each of the ASR module 61, the NLU module 63, and/or the TTS module 64.

The AI agent 62 may perform the above-described functions through deep learning. The deep learning represents data in a form (e.g., in case of an image, pixel information is expressed as a column vector) that the computer can understand when there is any data, and many studies (how to make better representation techniques and how to build a model to learn them) are being conducted to apply this to learning. As a result of these efforts, various deep learning techniques such as deep neural networks (DNN), convolutional deep neural networks (CNN), recurrent Boltzmann machine (RNN), restricted Boltzmann machine (RBM), deep belief networks (DBN), deep Q-network can be applied to fields such as computer vision, speech recognition, natural language processing, and voice/signal processing.

Currently, all major commercial speech recognition systems (MS Cortana, Skype translator, Google Now, Apple Siri, etc.) are based on deep learning techniques.

In particular, the AI agent 62 may perform various natural language processing including machine translation, emotion analysis, and information retrieval using deep artificial neural network structure in the field of natural language processing.

The cloud environment may include a service manager 65 capable of collecting various personalized information and supporting the function of the AI agent 62. The personalized information acquired through the service manager 65 may include at least one data (calendar application, messaging service, music application use, etc.) that the client device 50 uses through the cloud environment, at least one sensing data (camera, microphone, temperature, humidity, gyro sensor, C-V2X, pulse, ambient light, iris scan, etc.) that the client device 50 and/or the cloud device 60 collect, and off device data that is not directly related to the client device 50. For example, the personalized information may include maps, SMS, news, music, stock, weather, Wikipedia information.

The AI agent 62 is represented in a separate block to be distinguished from the ASR module 61, the NLU module 63, and the TTS module 64 for convenience of description, but the AI agent 62 may perform functions of at least a part or all of the modules 61, 62, and 64.

As above, FIG. 8 illustrates that the AI agent 62 is implemented in the cloud environment due to computing operation, storage, and power constraints, by way of example, but the present disclosure is not limited thereto.

For example, FIG. 9 is substantially the same as that illustrated in FIG. 8, except that the AI agent is included in the client device.

FIG. 9 illustrates an example block diagram of a voice processing device in a voice processing system according to another embodiment of the present disclosure. A client device 70 and a cloud environment 80 illustrated in FIG. 9 may correspond to the client device 50 and the cloud environment 60 mentioned in FIG. 8, except a difference in some configurations and functions. Hence, detailed functions of the corresponding block in FIG. 9 may refer to FIG. 8.

Referring to FIG. 9, the client device 70 may include a pre-processing module 51, a voice activation module 72, an ASR module 73, an AI agent 74, an NLU module 75, and a TTS module 76. In addition, the client device 70 may include an input module (at least one microphone) and at least one output module.

In addition, the cloud environment may include a cloud knowledge 80 that stores personalized information in the form of knowledge.

The function of each module illustrated in FIG. 9 may refer to FIG. 8. However, since the ASR module 73, the NLU module 75, and the TTS module 76 are included in the client device 70, communication with the cloud may not be required for speech processing such as speech recognition and speech synthesis. Hence, an instant and real-time speech processing operation is possible.

Each module illustrated in FIGS. 8 and 9 is merely an example for explaining a speech processing process, and may have more or fewer modules than the modules illustrated in FIGS. 8 and 9. It should also be noted that two or more modules may be combined or have different modules or different arrangements of modules. The various modules illustrated in FIGS. 8 and 9 may be implemented with software instructions, firmware, or a combination thereof for execution by one or more signal processing and/or on-demand integrated circuits, hardware, or one or more processors.

Figure 10:
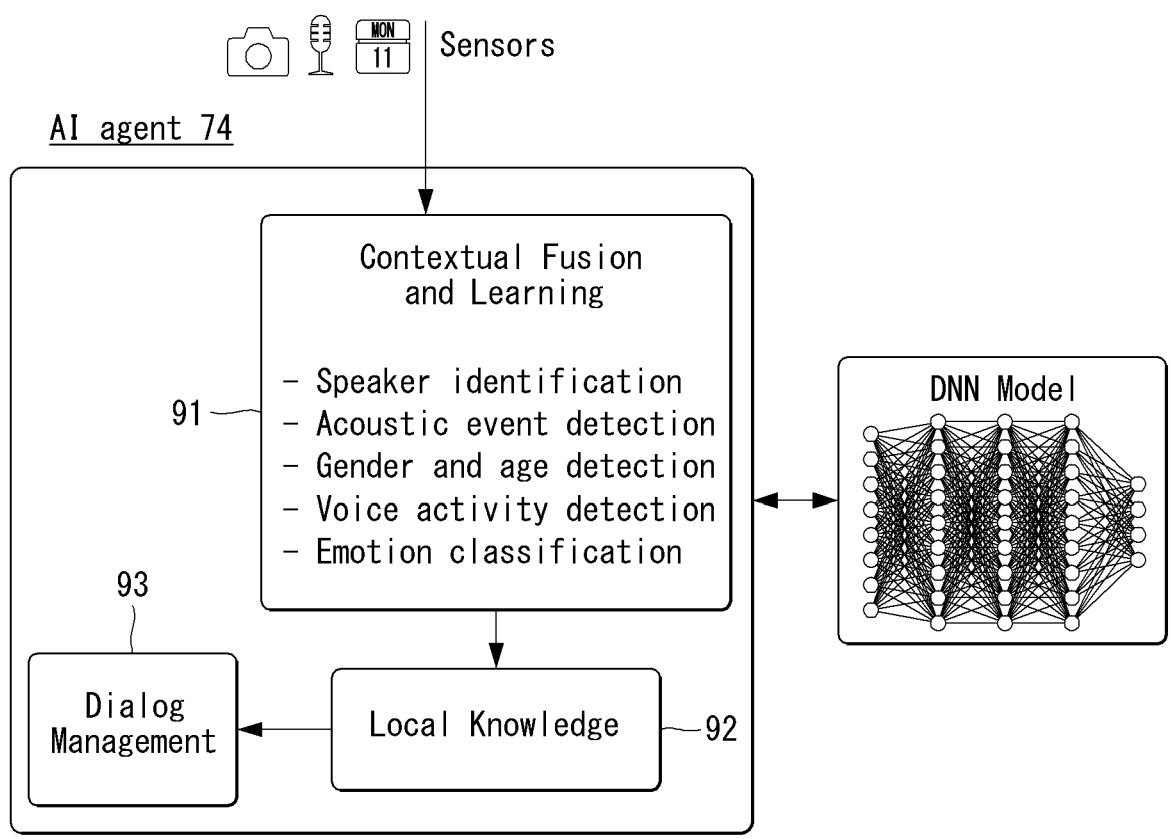
FIG. 10 is an example block diagram of an AI agent according to an embodiment of the present disclosure.

FIG. 10 illustrates an example block diagram of an AI agent according to an embodiment of the present disclosure.

Referring to FIG. 10, the AI agent 74 may support interactive operation with a user in addition to performing ASR operation, NLU operation, and TTS operation in the speech processing described through FIGS. 8 and 9. Alternatively, the AI agent 74 may contribute to the NLU module 63 that performs an operation of clarifying, supplementing, or additionally defining information included in text expressions received from the ASR module 61 using context information.

The context information may include client device user preference, hardware and/or software states of the client device, various sensor information collected before, during, or immediately after user input, previous interactions (e.g., conversations) between the AI agent and the user. It goes without saying that the context information in the present disclosure is dynamic and varies depending on time, location, content of the conversation, and other factors.

The AI agent 74 may further include a contextual fusion and learning module 91, a local knowledge 92, and a dialog management 93.

The contextual fusion and learning module 91 may learn a user's intention based on at least one data. The at least one data may include at least one sensing data acquired in a client device or a cloud environment. The at least one data may include speaker identification, acoustic event detection, speaker's personal information (gender and age detection), voice activity detection (VAD), and emotion classification.

The speaker identification may refer to specifying a person, who speaks, in a conversation group registered by voice. The speaker identification may include a process of identifying a previously registered speaker or registering a new speaker. The acoustic event detection may detect a type of sound and a location of the sound by detecting the sound itself beyond a speech recognition technology. The voice activity detection (VAD) is a speech processing technique of detecting the presence or absence of human speech (voice) in an audio signal which may include music, noise or other sounds. According to an example, the AI agent 74 may determine whether speech is present from the input audio signal. According to an example, the AI agent 74 may distinguish between speech data and non-speech data using a deep neural network (DNN) model. In addition, the AI agent 74 may perform an emotion classification operation on speech data using the DNN model. Speech data may be classified into anger, boredom, fear, happiness, and sadness according to the emotion classification operation.

The context fusion and learning module 91 may include the DNN model to perform the operation described above, and may determine an intention of a user input based on sensing information collected from the DNN model and a client device or collected in a cloud environment.

The at least one data is merely an example, and any data that may be referenced to determine the user's intention in a voice processing process may be included. The at least one data may be acquired through the DNN model described above.

The AI agent 74 may include the local knowledge 92. The local knowledge 92 may include user data. The user data may include a user's preference, a user address, a user's initial setting language, a user's contact list, and the like. According to an example, the AI agent 74 may additionally define a user intention by supplementing information included in the user's voice input using specific information of the user. For example, in response to a user's request "Invite my friends to my birthday party", the AI agent 74 may use the local knowledge 92 to determine who the "friends" are and when and where the "birthday party" will be given, without asking the user to provide more clear information.

The AI agent 74 may further include the dialog management 93. The dialog management 93 may be referred to as a dialog manager. The dialog manager 93 is a basic component of a voice recognition system and may manage essential information to generate an answer to a user intention analyzed by NLP. In addition, the dialog manager 93 may detect a barge-in event for receiving a user's voice input while a synthesized voice is output through a speaker in the TTS system.

The AI agent 74 may provide a dialog interface to enable voice conversation with a user. The dialog interface may refer to a process of outputting a response to a user's voice input through a display or a speaker. A final result output through the dialog interface may be based on the ASR operation, the NLU operation, and the TTS operation described above.

In the voice processing system, while the user is performing the communication through the client device, the speaker may stop an utterance input to the client device, input an utterance including other question to the client device, and continue the utterance, that has been previously performed, with reference to a response to the other question. Upon the conversation between people, a complete utterance is not always communicated, and in various cases, at least two utterances may be concatenated to create one intention. As described above, the voice processing system needs to analyze an intention of the utterance by covering at least two separated utterances.

In particular, the related art performs a natural language processing (NLP) operation on one utterance concatenating separated utterances in a method of removing the repeated same information by simply concatenating the separated utterances of a dialog, and thus can analyze an intention. However, the related art requires analyzing an intention of the utterance that can respond to various patterns based on the meaning of words, in addition to the simple concatenation.

Figure 11:
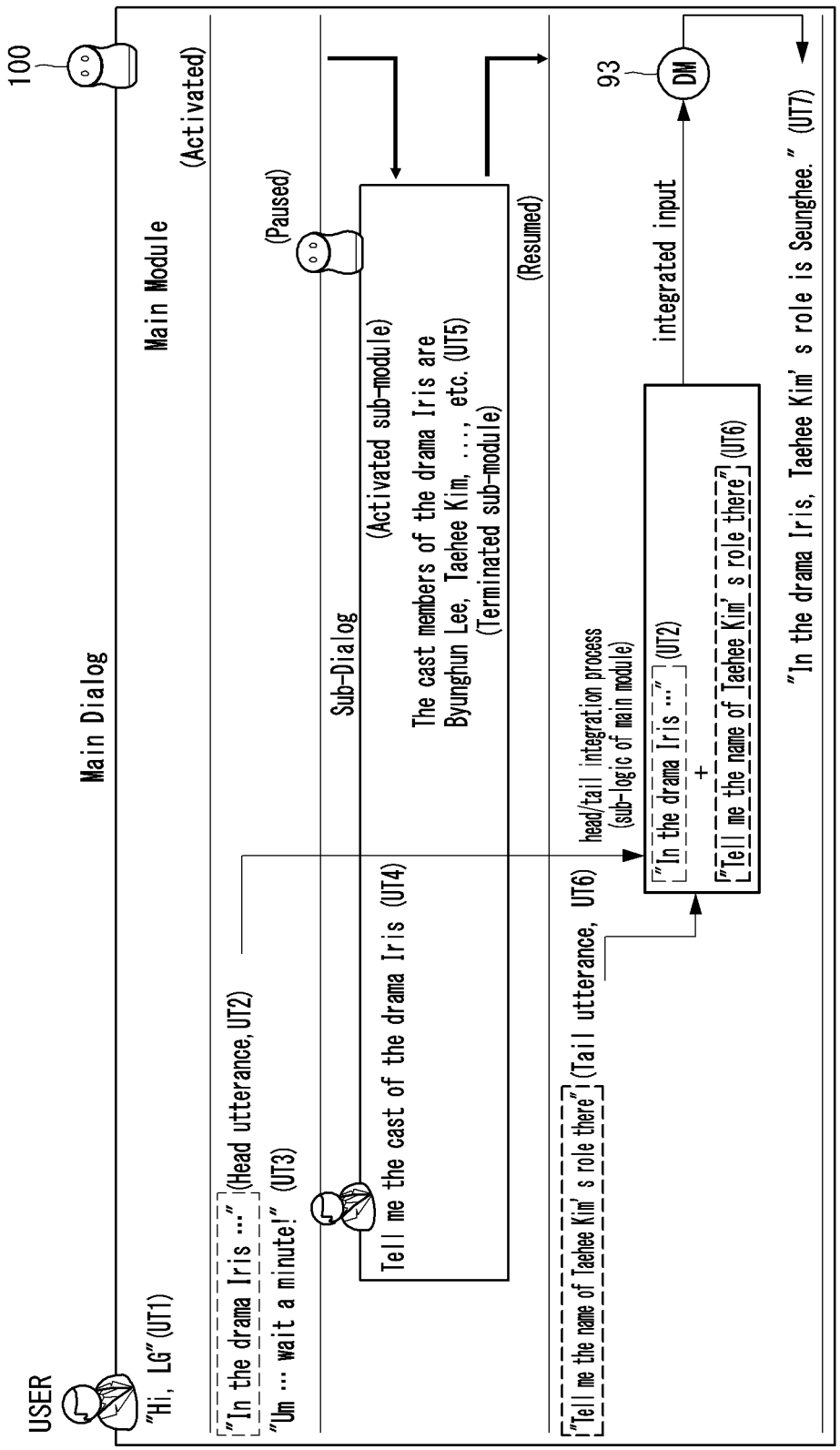
FIG. 11 illustrates an implementation of a method of analyzing an intention of a separated utterance according to an embodiment of the present disclosure.

FIG. 11 illustrates an example of a method of analyzing an intention of a separated utterance according to an embodiment of the present disclosure.

Figure 12:
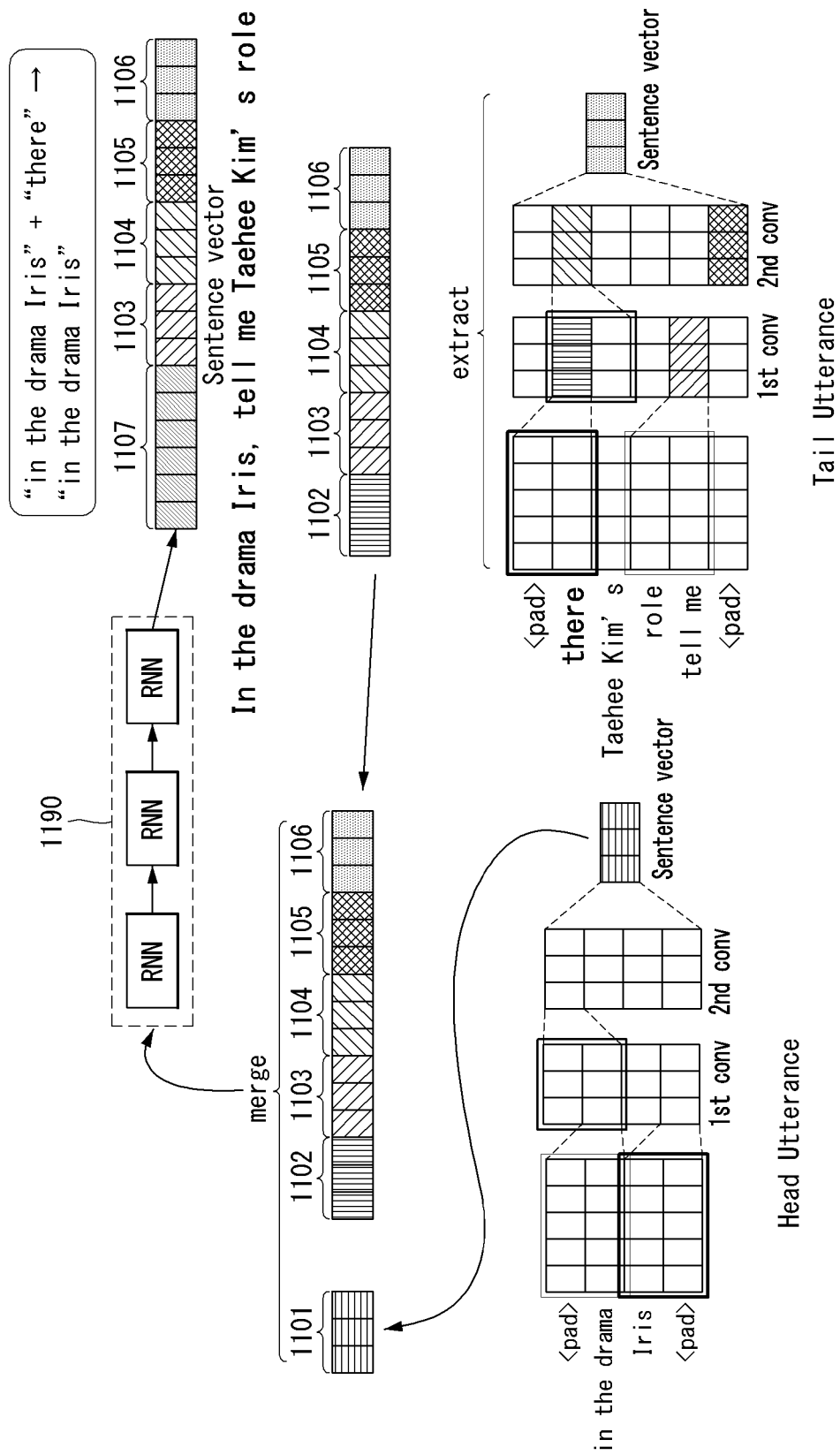
FIG. 12 illustrates a method of analyzing an intention of a separated utterance according to an embodiment of the present disclosure.
Figure 13:
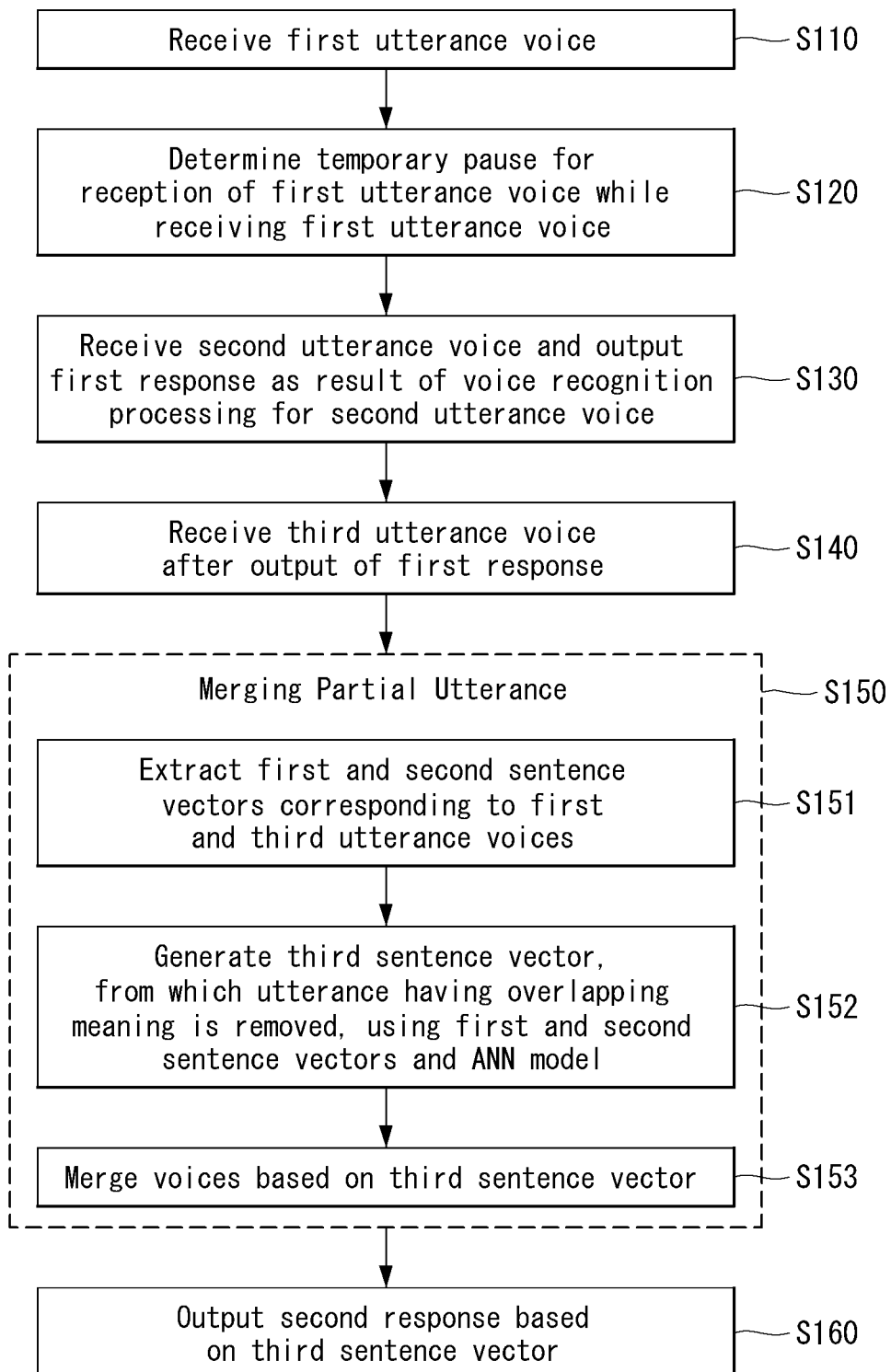
FIG. 13 is a flow chart illustrating a method of analyzing an intention of a separated utterance according to an embodiment of the present disclosure.

FIG. 11 illustrates the method on the assumption that the AI processing is performed by the AI device, but the present disclosure is not limited thereto. For example, the same AI processing can be performed by the AI server, that is able to communicate with the AI device 100, using specific information received from the AI device 100 in the same manner. In the present disclosure, 'AI server' may be used interchangeably with 'server', and 'AI processor' may be used interchangeably with 'processor'. In FIGS. 11 to 13, the processor refers to the AI processor included in the AI device, but the present disclosure is not limited thereto. As described above, it is apparent that the AI processor of the AI server can perform the same processing.

Referring to FIG. 11, the AI device 100 may receive a first utterance UT2 and a second utterance UT6. In FIG. 11, the first utterance UT2 means an utterance acquired before the detection of a stop signal when the stop signal is detected while receiving an utterance of the user, and the second utterance UT6 means an utterance acquired after detection of the stop signal when the stop signal is detected while receiving the user input. The second utterance UT6 belongs to the same dialog group as the first utterance UT2, and the AI device 100 may decide that the second utterance UT6 is an extension of the first utterance UT2.

In the present disclosure, the first utterance UT2 may be defined as a head utterance, and the second utterance UT6 may be defined as a tail utterance. FIG. 11 illustrates an example, in which "in the drama Iris . . . " is input as the head utterance UT2, and "tell me the name of Taehee Kim's role there" is input as the tail utterance UT6, as some embodiments of the present disclosure.

More specifically, the user may input a wake-up word and wake up the AI device 100. Herein, the wake-up word may be, for example, "Hi, LG" (UT1), but the present disclosure is not limited thereto. The AI device 100 may change a state to a wake-up mode for voice recognition in response to a voice input including the user's wake-up word.

The user may change the state of the AI device 100 to the wake-up mode through the wake-up word, and then enter a command for the purpose. For example, the user may ask the AI device 100 the name of the role that Taehee Kim will play in the drama Iris. However, in some cases, the user may forget the cast of the drama Iris, and hence the user may form a sub-dialog group to obtain confirmation of the cast of the drama Iris.

In this instance, the user may temporarily pause an utterance input of a main-dialog group by inputting one of a hesitation word, a silent delay, or a preset temporary pause keyword as a nonverbal element. For example, the user may change the state of the AI device 100 for the reception of the utterance to a temporary pause state by inputting "Wait a minute!" (UT3) as one of preset temporary pause keywords.

For reference, the hesitation word can mean a meaningless exclamation or mumbling, etc. that appear when the speaker cannot naturally utter during the utterance. For example, the hesitation word may be a meaningless syllable or word such as 'erm', 'um', 'uh', etc. The silent delay means non-input of utterance that appears when the speaker cannot continue the utterance for a predetermined period of time during the utterance. The preset temporary pause keyword may be stored in a database in which keywords related to a plurality of temporary pause commands are stored. For example, when a keyword related to the temporary pause command is input, the AI device 100 may compare this keyword with the keywords stored in the database and determine whether to temporarily pause the utterance reception.

Referring again to FIG. 11, the AI device 100 may receive, from the user, an utterance (e.g., "Um . . . wait a minute!" (UT3)) including the preset temporary pause keyword, and may temporarily stop a voice recognition process of the main-dialog group and at the same time perform the voice recognition process by the sub-dialog group. In this instance, the voice recognition process by the sub-dialog group may not have a contextual or logical relationship with the voice recognition process by the main-dialog group, and hence at least one utterance exchanged between the user in the sub-dialog group and the AI device 100 cannot affect analyzing an intention of a separated utterance included in the main-dialog group.

The user in the sub-dialog group may enter the command "tell me the cast of the drama Iris" (UT4) to the AI device 100, and the AI device 100 may output a response "the drama Iris cast members are Byunghun Lee, Taehee Kim, . . . , etc." (UT5) in response to the command. The sub-dialog group may be terminated at the same time that a response of the AI device 100 to the user's command is output. In this instance, the voice recognition process of the main-dialog group that has been temporarily paused may be resumed based on the end of the voice recognition process by the sub-dialog group.

The user may enter a new command to the AI device 100, including information known through the AI device 100 in the sub-dialog group. The new command is an utterance logically connected to a head utterance UT2 that the user inputs before the temporary pause by a stop signal as a nonverbal element, and may be defined as a tail utterance UT6. In particular, the related art calculated a similarity between a feature vector representing a pronunciation sequence of at least one word included in the head utterance UT2 and a feature vector representing a pronunciation sequence of at least one word included in the tail utterance UT6, and generated a new output from which an overlapping portion of the head utterance UT2 and the tail utterance UT6 was deleted. On the other hand, the voice processing method according to some embodiments of the present disclosure may compare a sentence vector representing the overall content of a sentence included in the head utterance UT2 with a sentence vector that is a concatenation of sub-vectors representing the content of a plurality of words included in the tail utterance UT6, and may generate an output from which at least one word having an overlapping meaning is removed. Unlike the related art, the voice processing method according to some embodiments of the present disclosure can generate an output, from which an utterance portion fluidly overlapping with various utterance patterns is excluded, regardless of identity determined by comparing one or more words based on the pronunciation sequence.

The AI device 100 may generate an output from which at least one word having the above-described overlapping meaning is removed, and apply the generated output to the dialog manager. The dialog manager may send the user a response to both the head utterance UT2 and the tail utterance UT6 based on the ASR operation, the NLU operation, and the TTS operation through the output device (e.g., speaker, display, etc.).

FIG. 12 illustrates a method of analyzing an intention of a separated utterance according to an embodiment of the present disclosure.

Referring to FIG. 12, the AI device 100 may calculate a similarity between a first sentence vector 1101 for a head utterance UT2 and a second sentence vector concatenating a plurality of sub-vectors extracted from at least one word included in a tail utterance UT6, and may determine a sub-vector having a similarity, that is equal to or greater than a threshold, as at least one word having an overlapping meaning. Further, the AI device 100 may generate a response, from which at least one word having the overlapping meaning is deleted, upon generation of a response to an utterance including the head utterance UT2 and the tail utterance UT6.

In FIG. 12, the head utterance UT2 includes <pad>, 'in the drama', 'Iris', and <pad>, and the content of the head utterance UT2 may be expressed as the first sentence vector 1101 having 1×3 size via first and second convolution layers (1st conv and 2nd conv).

The tail utterance UT6 includes <pad>, 'there', 'Taehee Kim's', 'role', 'tell me', and <pad>, and the AI device 100 may extract a sub-vector representing the content of the tail utterance UT6 using at least one convolution layer for the tail utterance UT6 at each convolution step. As above, the sub-vector extracted at each convolution step may be used for the concatenation with the head utterance UT2. In the case of the tail utterance UT6 unlike the head utterance UT2, the AI device 100 may extract, as a sub-vector, a feature generated in at least one convolution layer. For example, the AI device 100 may apply the tail utterance UT6 to a convolutional neural network including the first and second convolution layers (1st conv and 2nd conv), and extract first to fifth sub-vectors 1102, 1103, 1104, 1105, and 1106. The AI device 100 may concatenate the first to fifth sub-vectors 1102, 1103, 1104, 1105, and 1106 to generate a second sentence vector.

For reference, <pad> means padding. A pixel corresponding to the padding is an edge component that has a value of zero, passes through a convolution filter, and is additionally coupled to the outside of input data to prevent a reduction in information size of an output. Since the padding is obvious to those skilled in the art related to the convolution-based feature extraction, the above description is omitted.

The AI device 100 may concatenate the first sentence vector 1101 and the second sentence vector and apply it, as an input, to a pre-trained learning model 1190. In this instance, the AI device 100 may calculate a similarity between a plurality of sub-vectors included in the first sentence vector 1101 and the second sentence vector using the learning model 1190, and generate an output based on the calculated similarity. Herein, the learning model 1190 may be a learning model based on a recurrent neural network (RNN), but the preset disclosure is not limited thereto. For example, the preset disclosure may calculate a similarity between the first sub-vector 1102 and the first sentence vector 1101 and generate a new third sentence vector as an output if the calculated similarity is equal to or greater than a threshold. The third sentence vector may include a sixth sub-vector 1107 and the second to fifth sub-vectors 1103, 1104, 1105, and 1106, unlike a concatenation vector by the simple concatenation of the first and second sentence vectors. The second to sixth sub-vectors 1103, 1104, 1105, 1106, and 1107 form the third sentence vector in the concatenation form.

That is, the AI device 100 can generate the third sentence vector including the sixth sub-vector, in which the first sentence vector 1101 corresponding to "in the drama Iris" and the first sub-vector 1102 corresponding to "there" are concatenated and/or combined, and as a result, can derive a determination result of "in the drama Iris" by concatenating "in the drama Iris" and "there". As above, a method of analyzing an intention of the separated utterance applied to some embodiments of the present disclosure may dispose a pronunciation sequence very approximate to the head utterance UT2 at a front end of the tail utterance UT6, and also may analyze an intention of an utterance by merging two separated utterances if pronunciation sequences are different from each other, but have semantically consistency.

The feature extraction included in the head utterance UT2 and/or the tail utterance UT6 illustrated in FIG. 12 has performed based on the convolutional neural network (CNN), but the preset disclosure is not limited thereto. For example, the recurrent neural network or various other methods can be used. In addition, various convolution layers and the sizes of the sentence vector illustrated in FIG. 12 are not limited to FIG. 12. For example, more or fewer convolution layers may be used, and more or fewer sizes of the sentence vector may be implemented.

FIG. 13 is a flow chart illustrating a method of analyzing an intention of a separated utterance according to an embodiment of the present disclosure.

Referring to FIG. 13, the AI device 100 may receive a first utterance voice in S110. The first utterance voice may include a command that is input after a voice including a wake-up word of the user.

The AI device 100 may determine a temporary pause for the reception of the first utterance voice while receiving the first utterance voice in S120. If the AI device 100 detects a stop signal, the AI device 100 may determine the temporary pause for the reception of the first utterance voice. The stop signal may include a voice signal corresponding to one of a hesitation word, a silent delay, or a preset temporary pause keyword as a nonverbal element. If the AI device 100 temporarily pauses the reception of the first utterance voice, the AI device 100 may wait for an additional voice input for the first utterance voice that is input before a temporary pause state.

If the temporary pause state is determined, the AI device 100 may receive a second utterance voice and output a first response as a result of voice recognition processing for the second utterance voice in S130.

If the AI device 100 outputs the first response, the AI device 100 may terminate the temporary pause and additionally receive a third utterance voice subsequent to the first utterance voice in S140. The third utterance voice may be an utterance belonging to the same dialog group as the first utterance voice.

The AI device 100 may determine an utterance intention and/or essential information by merging the first and third utterance voices included in one dialog group, and generate an output representing a result of determination in S150.

Specifically, the AI device 100 may extract first and second sentence vectors respectively corresponding to the first and third utterance voices in S151. The AI device 100 may generate a third sentence vector, from which an utterance (or word) having an overlapping meaning is removed, using the first and second sentence vectors and a learning model (ANN model) based on a pre-trained artificial neural network in S152. The AI device 100 may synthesize the voices based on the third sentence vector in S153.

More specifically, the first sentence vector may be a vector representing the overall content of the first utterance voice, and the second sentence vector may be a vector concatenating a plurality of sub-vectors extracted from at least one word included in the third utterance voice. The AI device 100 may calculate a similarity between the first sentence vector and at least one of a plurality of sub-vectors constituting the second sentence vector. If it is determined that the first sentence vector and one of the plurality of sub-vectors have an overlapping meaning based on the calculated similarity, the AI device 100 may generate an output (e.g., third sentence vector) from which at least one word having the overlapping meaning is removed. In this instance, at least one word having the overlapping meaning may include a word corresponding to at least one of the plurality of sub-vectors that is calculated that a similarity between the vectors is equal to or greater than a threshold.

The first and second sentence vectors may be extracted using the convolutional neural network, and the learning model used in some embodiments of the present disclosure may be implemented as a learning model based on the recurrent neural network. The learning model may be a learning model based on the artificial neural network including an input layer, a hidden layer, and an output layer each having at least one node, and some of the at least one node may have different weights in order to generate the third sentence vector based on the understanding of contexts of the first utterance voice and the third utterance voice.

The AI device 100 may output a second response, that is a synthesized voice based on the third sentence vector, through an output device (e.g., a speaker, a display, etc.) in S160.

FIG. 13 illustrates the voice processing system performing on-device processing, by way of example, but the present disclosure is not limited thereto. The method of analyzing an intention of a separated utterance according to an embodiment of the present disclosure can be equally implemented even in a cloud environment or an environment of the server 200, and this is described with reference to FIG. 14.

FIG. 14 is a sequence diagram illustrating a method of analyzing an intention of a separated utterance according to an embodiment of the present disclosure. In FIG. 14, the server 200 refers to a server 200 connected to a cloud network (see FIG. 7). In FIG. 14, the server 200 may be used interchangeably with 'network' or '5G network'.

The AI device 100 may first control a communication module to send head and tail (UT6) utterances or features extracted from the head and tail (UT6) utterances to an AI processor included in a network. The AI device 100 may control the communication module to receive AI processing information from the network.

The AI device 100 may perform an initial access procedure with the server 200 to send the head and tail (UT6) utterances to the server 200. The AI device 100 may perform the initial access procedure with the server 200 based on a synchronization signal block (SSB).

The AI device 100 may receive, from the server 200, downlink control information (DCI) used to schedule the transmission of the head and tail (UT6) utterances through the communication module.

The AI device 100 may send the server 200 the head and tail (UT6) utterances or the features extracted from the head and tail (UT6) utterances based on the DCI.

The head and tail (UT6) utterances or the features extracted from the head and tail (UT6) utterances is transmitted to the server 200 via a physical uplink shared channel (PUSCH), and the SSB and a demodulation reference signal (DM-RS) of the PUSCH may be QCLed for QCL (quasi co-located) type D.

Referring to FIG. 14, the server 200 may receive a first utterance voice from the AI device 100 in S210. The first utterance voice may include a command that is input after a voice including a wake-up word of the user.

The server 200 may determine a temporary pause for the reception of the first utterance voice while receiving the first utterance voice in S220. If the server 200 detects a stop signal, the server 200 may determine the temporary pause for the reception of the first utterance voice. The stop signal may include a voice signal corresponding to one of a hesitation word, a silent delay, or a preset temporary pause keyword as a nonverbal element. If the server 200 temporarily pauses the reception of the first utterance voice, the server 200 may wait for an additional voice input for the first utterance voice that is input before a temporary pause state.

If the temporary pause state is determined, the server 200 may receive a second utterance voice and send the AI device 100 a first response as a result of voice recognition processing for the second utterance voice in S230, S240, and S250.

If the server 200 sends the first response, the server 200 may terminate the temporary pause and additionally receive a third utterance voice subsequent to the first utterance voice in S260. The third utterance voice may be an utterance belonging to the same dialog group as the first utterance voice.

The server 200 may determine an utterance intention and/or essential information by merging the first and third utterance voices included in one dialog group, and generate an output representing a result of determination in S270.

Specifically, the server 200 may extract first and second sentence vectors respectively corresponding to the first and third utterance voices in S271. The server 200 may generate a third sentence vector, from which an utterance (or word) having an overlapping meaning is removed, using the first and second sentence vectors and a learning model (ANN model) based on a pre-trained artificial neural network in S272. The server 200 may synthesize the voices based on the third sentence vector in S273.

More specifically, the first sentence vector may be a vector representing the overall content of the first utterance voice, and the second sentence vector may be a vector concatenating a plurality of sub-vectors extracted from at least one word included in the third utterance voice. The server 200 may calculate a similarity between the first sentence vector and at least one of a plurality of sub-vectors constituting the second sentence vector. If it is determined that the first sentence vector and one of the plurality of sub-vectors have an overlapping meaning based on the calculated similarity, the server 200 may generate an output (e.g., third sentence vector) from which at least one word having the overlapping meaning is removed. In this instance, at least one word having the overlapping meaning may include a word corresponding to at least one of the plurality of sub-vectors that is calculated that a similarity between the vectors is equal to or greater than a threshold.

The first and second sentence vectors may be extracted using the convolutional neural network, and the learning model used in some embodiments of the present disclosure may be implemented as a learning model based on a recurrent neural network. The learning model may be a learning model based on the artificial neural network including an input layer, a hidden layer, and an output layer each having at least one node, and some of the at least one node may have different weights in order to generate the third sentence vector based on the understanding of contexts of the first utterance voice and the third utterance voice.

The server 200 may send the AI device 100 a second response, that is a synthesized voice based on the third sentence vector, in S280.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A voice processing method for controlling an artificial intelligence device, the voice processing method comprising:

in response to detecting, by a processor in the artificial intelligence device, a stop signal during a reception of a first utterance, temporarily pausing the reception of the first utterance;

receiving, by the processor, a sub-utterance while the reception of the first utterance is temporarily paused;

outputting, by the processor, a first result corresponding to the sub-utterance while the reception of the first utterance is temporarily paused;

receiving, by the processor, a second utterance after a termination of a temporary pause state based on the stop signal;

applying, by the processor, a concatenated vector concatenating first and second sentence vectors extracted from the first and second utterances to a pre-trained learning model to generate an output from which at least one word having an overlapping meaning is removed; and outputting, by the processor, a second result according to the output generated by the pre-trained learning model, the second result being different than the first result, wherein the stop signal is a voice signal corresponding to one of a hesitation word, a silent delay, or a preset temporary pause keyword or sound, wherein the artificial intelligence device is prevented from providing an answer to the first utterance while the reception of the first utterance is paused, wherein the second sentence vector is a vector concatenating a plurality of sub-vectors extracted from at least one word included in the second utterance,
wherein generating the output comprises:
calculating a similarity between the first sentence vector and at least one of the plurality of sub-vectors constituting the second sentence vector; and
in response to determining that the first sentence vector and the at least one of the plurality of sub-vectors have the overlapping meaning based on the similarity, generating the output from which the at least one word having the overlapping meaning is removed, and
wherein the at least one word having the overlapping meaning is a word corresponding to at least one of the plurality of sub-vectors having a calculated similarity that is equal to or greater than a threshold.

2. The voice processing method of claim 1, further comprising, if the reception of the first utterance is temporarily paused, waiting for an additional voice input for the first utterance that is input before the temporary pause state.

3. The voice processing method of claim 1, wherein the first sentence vector is a vector representing an overall content of the first utterance.

4. The voice processing method of claim 1, wherein the first and second sentence vectors are extracted by a convolutional neural network (CNN).

5. The voice processing method of claim 1, wherein the learning model is a learning model based on an artificial neural network,
wherein the artificial neural network includes an input layer, a hidden layer, and an output layer each having at least one node.

6. The voice processing method of claim 5, wherein the learning model is a learning model based on a recurrent neural network (RNN).

7. The voice processing method of claim 5, wherein at least some nodes in the artificial neural network have different weights in order to generate the output.

8. The voice processing method of claim 1, wherein the second utterance is an utterance belonging to a same dialog group as the first utterance.

9. A non-transitory computer readable recording medium on which a program for implementing the method according to claim 1 is recorded.

10. A voice processing method for controlling an artificial intelligence device, the voice processing method comprising:
in response to detecting, by a processor in the artificial intelligence device, a stop signal while a first utterance is transmitted to a server, temporarily pausing transmission of the first utterance;
receiving, by the processor, a sub-utterance while the transmission of the first utterance is temporarily paused;
outputting, by the processor, a first result corresponding to the sub-utterance while the transmission of the first utterance is temporarily paused;
transmitting, by the processor, a second utterance to the server after a termination of a temporary pause state based on the stop signal;
applying, by the processor, a concatenated vector concatenating first and second sentence vectors extracted from the first and second utterances to a pre-trained learning model and receiving, from the server, an output from which at least one word having an overlapping meaning is removed; and
outputting, by the processor, a second result according to the output from the server, the second result being different than the first result,
wherein the stop signal is a voice signal corresponding to one of a hesitation word, a silent delay, or a preset temporary pause keyword or sound,
wherein the artificial intelligence device is prevented from providing an answer to the first utterance while the reception of the first utterance is paused,
wherein the second sentence vector is a vector concatenating a plurality of sub-vectors extracted from at least one word included in the second utterance,
wherein generating the output comprises:
calculating a similarity between the first sentence vector and at least one of the plurality of sub-vectors constituting the second sentence vector; and
in response to determining that the first sentence vector and the at least one of the plurality of sub-vectors have the overlapping meaning based on the similarity, generating the output from which the at least one word having the overlapping meaning is removed, and
wherein the at least one word having the overlapping meaning is a word corresponding to at least one of the plurality of sub-vectors having a calculated similarity that is equal to or greater than a threshold.

11. The voice processing method of claim 10, further comprising:
receiving, from a network, downlink control information (DCI) used to schedule the transmission of the first and second utterances; and
transmitting the first and second utterances to the network based on the DCI.

12. The voice processing method of claim 11, further comprising:
performing an initial access procedure with the network based on a synchronization signal block (SSB); and
transmitting the first and second utterances to the network via a physical uplink shared channel (PUSCH),
wherein the SSB and a demodulation reference signal (DM-RS) of the PUSCH are QCLed for QCL (quasi co-located) type D.

13. The voice processing method of claim 12, further comprising:
controlling a communication module to transmit the first and second utterances to an AI processor included in the network; and
controlling the communication module to receive AI processing information from the AI processor,
wherein the AI processing information is voice information synthesized based on the output from which the at least one word having the overlapping meaning is removed.

14. An artificial intelligence device for voice processing, comprising:
a memory configured to store utterances from a user; and
a processor configured to:
detect a stop signal during a reception of a first utterance, and temporarily pause the reception of the first utterance,
receive a sub-utterance while the reception of the first utterance is temporarily paused,
output a first result corresponding to the sub-utterance while the reception of the first utterance is temporarily paused,
receive a second utterance after a termination of a temporary pause state based on the stop signal, apply a concatenated vector concatenating first and second sentence vectors extracted from the first and second utterances to a pre-trained learning model to generate an output from which at least one word having an overlapping meaning is removed, and output a second result according to the output generated by the pre-trained learning model, the second result being different than the first result, wherein the stop signal is a voice signal corresponding to one of a hesitation word, a silent delay, or a preset temporary pause keyword or sound, wherein the artificial intelligence device is prevented from providing an answer to the first utterance while the reception of the first utterance is paused, wherein the second sentence vector is a vector concatenating a plurality of sub-vectors extracted from at least one word included in the second utterance, wherein the processor is further configured to:

calculate a similarity between the first sentence vector and at least one of the plurality of sub-vectors constituting the second sentence vector; and in response to determining that the first sentence vector and the at least one of the plurality of sub-vectors have the overlapping meaning based on the similarity, generate the output from which the at least one word having the overlapping meaning is removed, and wherein the at least one word having the overlapping meaning is a word corresponding to at least one of the plurality of sub-vectors having a calculated similarity that is equal to or greater than a threshold.

* * * * *